United States Patent
Doihara et al.

(10) Patent No.: US 8,892,318 B2
(45) Date of Patent: Nov. 18, 2014

(54) CONTROLLER AND CONTROL METHOD OF BELT TYPE CONTINUOUSLY VARIABLE TRANSMISSION

(75) Inventors: Katsumi Doihara, Fuji (JP); Yoshihisa Kodama, Fuji (JP); Yasuaki Yoshikawa, Fuji (JP); Masahiro Nishi, Fuji (JP); Keisuke Koyama, Fuji (JP); Kenta Nakamura, Fuji (JP); Kiyotaka Sawano, Fuji (JP); Hidemasa Kawaguchi, Fuji (JP)

(73) Assignees: Jatco Ltd, Fuji-shi (JP); Nissan Motor Co., Ltd., Yokohama-shi (JP)

( * ) Notice: Subject to any disclaimer, the term of this patent is extended or adjusted under 35 U.S.C. 154(b) by 503 days.

(21) Appl. No.: 13/266,804

(22) PCT Filed: Apr. 30, 2009

(86) PCT No.: PCT/JP2009/058458
§ 371 (c)(1),
(2), (4) Date: Jan. 9, 2012

(87) PCT Pub. No.: WO2010/125666
PCT Pub. Date: Nov. 4, 2010

(65) Prior Publication Data
US 2012/0135829 A1      May 31, 2012

(51) Int. Cl.
*G06F 7/00*         (2006.01)
*F16H 61/662*    (2006.01)
*F16H 59/46*      (2006.01)

(52) U.S. Cl.
CPC .... *F16H 61/66272* (2013.01); *F16H 2059/465* (2013.01)
USPC ................................. 701/55; 701/51; 477/45

(58) Field of Classification Search
CPC .................... F16H 61/66272; F16H 2059/465
See application file for complete search history.

(56) References Cited

U.S. PATENT DOCUMENTS

| 4,649,486 A | 3/1987 | Oshiage |
| 4,735,597 A | 4/1988 | Cadee |

(Continued)

FOREIGN PATENT DOCUMENTS

| CN | 1657803 A | 8/2005 |
| EP | 1236935 A2 | 9/2002 |

(Continued)

OTHER PUBLICATIONS

Russian Office Action and English Translation, dated Mar. 5, 2013, 15 pages.

(Continued)

*Primary Examiner* — David D Le
(74) *Attorney, Agent, or Firm* — Foley & Lardner LLP

(57) ABSTRACT

A control device controls a belt type continuously variable transmission including a primary pulley, a secondary pulley, and a belt, and controls a gear ratio based on a primary oil pressure and a secondary oil pressure. The control device includes a belt slip controller which oscillates the secondary oil pressure and monitors a phase difference between an oscillation component included in an actual secondary oil pressure and an oscillation component included in an actual gear ratio to estimate a belt slip state. The controller controls the actual secondary oil pressure to decrease based on the estimation to maintain a predetermined belt slip state. An oscillation amplitude setter sets an oscillation amplitude of the secondary hydraulic pressure small when the gear ratio is high compared with when the gear ratio is low, in a case of oscillating the secondary hydraulic pressure in the belt slip control.

14 Claims, 16 Drawing Sheets

(56) References Cited

U.S. PATENT DOCUMENTS

| | | | |
|---|---|---|---|
| 5,766,105 A | 6/1998 | Fellows et al. | |
| 7,179,196 B2 | 2/2007 | Oshita et al. | |
| 7,189,184 B2 | 3/2007 | Oshiumi et al. | |
| 7,774,120 B2 * | 8/2010 | Yamaguchi et al. | 701/61 |
| 7,819,764 B2 | 10/2010 | Kimura et al. | |
| 7,892,141 B2 | 2/2011 | Yamaguchi et al. | |
| 8,133,140 B2 * | 3/2012 | Yamaguchi et al. | 474/28 |
| 8,600,634 B2 | 12/2013 | Van Der Sluid et al. | |
| 2002/0155910 A1 * | 10/2002 | Nishizawa et al. | 474/69 |
| 2004/0242355 A1 | 12/2004 | Yamaguchi et al. | |
| 2005/0181909 A1 | 8/2005 | Oshiumi et al. | |
| 2007/0197320 A1 | 8/2007 | Kimura et al. | |
| 2007/0232424 A1 | 10/2007 | Nishida | |
| 2008/0146409 A1 | 6/2008 | Yamaguchi et al. | |
| 2012/0252612 A1 | 10/2012 | Kodama et al. | |
| 2012/0258825 A1 | 10/2012 | Kodama et al. | |

FOREIGN PATENT DOCUMENTS

| | | |
|---|---|---|
| EP | 1 329 650 A2 | 7/2003 |
| EP | 1 698 805 A2 | 9/2006 |
| JP | 4-13575 B2 | 3/1992 |
| JP | 2009-65428 A | 3/2003 |
| JP | 2003-202075 A | 7/2003 |
| JP | 2003-236509 A | 8/2003 |
| JP | 2004-293652 A | 10/2004 |
| JP | 2004-316860 A | 11/2004 |
| JP | 2004-358999 A | 12/2004 |
| JP | 2005-030511 A | 2/2005 |
| JP | 2007-211855 A | 8/2007 |
| JP | 2008-151198 A | 7/2008 |
| RU | 2 012 833 C1 | 5/1994 |
| RU | 2 133 895 C1 | 7/1999 |
| SU | 1454242 A3 | 1/1989 |
| SU | 1682691 A1 | 10/1991 |
| WO | WO 2009/007450 A2 | 1/2009 |

OTHER PUBLICATIONS

U.S. Appl. No. 13/266,808, filed Oct. 28, 2011, Doihara et al.
U.S. Appl. No. 13/266,816, filed Oct. 28, 2011, Doihara et al.
U.S. Appl. No. 13/266,823, filed Oct. 28, 2011, Doihara et al.
U.S. Appl. No. 13/266,830, filed Oct. 28, 2011, Doihara et al.
K. Doihara, U.S. PTO Official Action, U.S. Appl. No. 13/266,823, dated May 2, 2014, 17 pages.
K. Doihara, U.S. PTO Official Action, U.S. Appl. No. 13/266,816, dated May 29, 2014, 20 pages.
K. Doihara, U.S. PTO Notice of Allowance, U.S. Appl. No. 13/266,830, dated May 27, 2014, 18 pages.
K. Doihara, U.S. PTO Notice of Allowance, U.S. Appl. No. 13/266,816, dated Aug. 21, 2014, 11 pages.
K. Doihara, U.S. PTO Notice of Allowance, U.S. Appl. No. 13/266,823, dated Aug. 18, 2014, 11 pages.

* cited by examiner

CONTROLLER AND CONTROL METHOD OF BELT TYPE CONTINUOUSLY VARIABLE TRANSMISSION

TECHNICAL FIELD

The present invention relates to a device and a method for controlling a belt type continuously variable transmission to perform a belt slip control in which a belt wound around pulleys is slipped at a predetermined slip rate.

BACKGROUND ART

A known belt type continuously variable transmission controller is configured to perform a belt slip control in which an actual secondary hydraulic pressure is reduced from one during a normal control to slip a belt wound around pulleys at a predetermined slip rate by controlling the actual secondary hydraulic pressure on the basis of a multiplier of an oscillation component included in the actual secondary hydraulic pressure and an oscillation component included in an actual gear ratio. This eliminates the necessity for directly detecting the belt slip rate and thereby facilitates the belt slip control (see Patent Document 1, for example).

PRIOR ART DOCUMENT

Patent Document

Patent Document 1: WO 2009/007450 A2 (PCT/EP2008/059092)

SUMMARY OF THE INVENTION

Problems to be Solved by the Invention

However, in such a conventional belt type continuously variable transmission controller, a method for setting an oscillation amplitude of the secondary hydraulic pressure during the belt slip control has not been mentioned; therefore the following problem occurs.

In a case of oscillating the secondary hydraulic pressure, and performing the belt slip control on the basis of the oscillation component included in the actual secondary hydraulic pressure and the oscillation component included in the actual gear ratio, it is necessary to set the oscillation amplitude of the secondary hydraulic pressure sufficiently enough to extract the oscillation component from the actual gear ratio. On the other hand, in a case of obtaining an effect of energy saving such as improvement of fuel efficiency by the slip control, a reduction margin of the secondary hydraulic pressure becomes an effect margin; therefore it is necessary to set the oscillation amplitude to a small value that is capable of reducing the actual secondary hydraulic pressure to the limit (determined by the slip rate, a lowest pressure, a lowest transmission torque capacity, or the like). And if the oscillation amplitude of the secondary hydraulic pressure increases, vehicle vibration occurs and driving performance of a vehicle is deteriorated; therefore it is necessary to set the oscillation amplitude so as not to generate vehicle vibration by the belt slip control.

Therefore, during the belt slip control, in a case where the oscillation amplitude is given to the secondary hydraulic pressure at a constant value, if the oscillation amplitude is set at a large value, it is possible to ensure detection performance of a belt slip state by extracting the oscillation component from the actual gear ratio; however, sufficient improvement of the effect of energy saving is not achieved, and vehicle vibration by the belt slip control occurs and the driving performance is deteriorated. And if the oscillation amplitude is set at a small value, the improvement of the effect of energy saving is achieved and vehicle vibration does not occur, however it is not possible to ensure the detection performance of the belt slip by the extracting the oscillation component from the actual gear ratio. That is, there is a trade-off relationship between the improvement of the effect of energy saving, an occurrence of vehicle vibration by the belt slip control, and ensuring the detection performance of the belt slip state.

In view of solving the above problem, the present invention aims to provide a control device and method for a belt type continuously variable transmission which can achieve the improvement of the effect of energy saving, suppress an occurrence of vehicle vibration by the belt slip control, and ensure the detection performance of the belt slip state together, by setting the oscillation amplitude corresponding to a gear ratio where the belt slip control is performed

Means to Solve the Problem

To attain the above object, a control device for a belt type continuously variable transmission according to the present invention includes a primary pulley for receiving an input from a drive source, a secondary pulley for providing an output to a drive wheel, and a belt wound around the primary pulley and the secondary pulley, to control a gear ratio determined by a ratio of the diameter of the pulleys where the belt is wound around by controlling a primary hydraulic pressure to the primary pulley and a secondary hydraulic pressure to the secondary pulley.

The device further comprises a belt slip control means configured to oscillate the secondary hydraulic pressure and monitor a phase difference between an oscillation component included in an actual secondary hydraulic pressure and an oscillation component included in an actual gear ratio to estimate a belt slip condition, and control the actual secondary hydraulic pressure to decrease on the basis of the estimation to maintain a predetermined belt slip state, and an oscillation amplitude setting means configured to set an oscillation amplitude of the secondary hydraulic pressure small when the gear ratio is a high gear ratio compared with when the gear ratio is a low gear ratio in a case of oscillating the secondary hydraulic pressure by the belt slip control.

Effects of the Invention

Thus, according to the control device for the belt type continuously variable transmission, in a case of oscillating the secondary hydraulic pressure by the belt slip control, in the oscillation amplitude setting means, the oscillation amplitude of the secondary hydraulic pressure is set small when in the high gear ratio compared with when in the low gear ratio.

That is, in a case of being focused on a high-low change of the gear ratio, with respect to the same oscillation amplitude of the secondary hydraulic pressure, as the gear ratio is on a side of the high gear ratio, sensitivity of a primary thrust is high, in other words, it has been discovered that the sensitivity of gear ratio variation is high and oscillation of the gear ratio tends to occur. This means that the detection performance of the belt slip state by extracting the oscillation component from the secondary hydraulic pressure can be ensured, in a case where the gear ratio is on the side of the high gear ratio, even if the oscillation amplitude of the secondary hydraulic pressure is set at a small value. And by setting the oscillation amplitude of the secondary hydraulic pressure at the small value when the gear ratio is at the high gear ratio, the occurrence of vehicle vibration by the belt slip control is prevented, and the improvement of the effect of energy saving can be achieved. And when the gear ratio is at the low gear ratio, the oscillation amplitude of the secondary hydraulic pressure is set at a large value compared with when being at the high gear ratio; however, aiming at a limit range of the detection performance of the belt slip state with respect to the gear ratio during the belt slip control makes it possible to achieve the effect of energy saving of a maximum range.

As a result, by setting the oscillation amplitude corresponding to the gear ratio where the belt slip control is performed, it is possible to achieve the improvement of the effect of energy saving, suppress the occurrence of vehicle vibration by the belt slip control, and ensure the detection performance of the belt slip state.

EMBODIMENTS OF DESCRIPTION

Hereinafter, the best mode to carry out the control device and method for a belt type continuously variable transmission will be described using a first embodiment and a second embodiment with reference to the accompanying drawings.

First Embodiment

Figure 1:
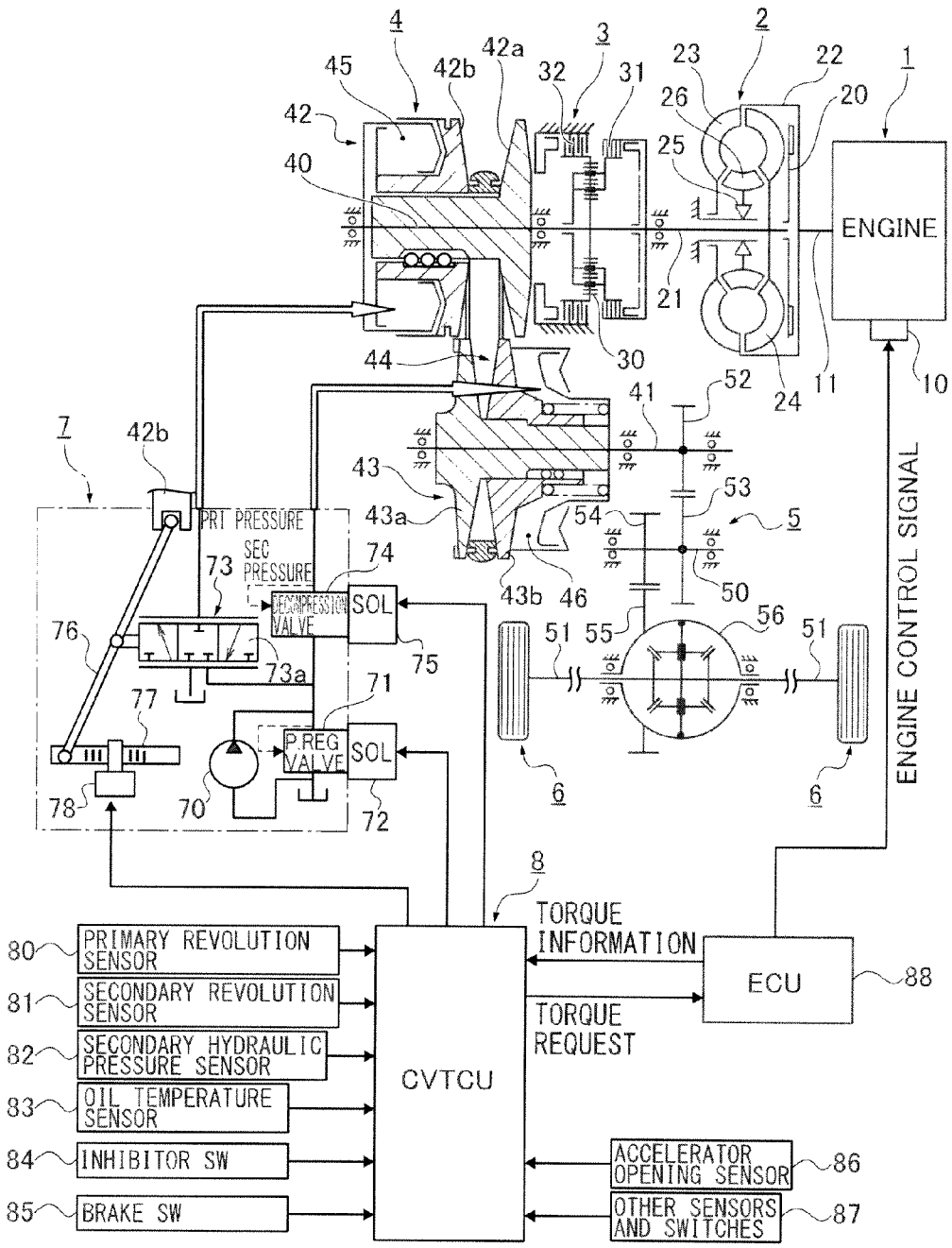
FIG. 1 shows the entire system of a drive system and a control system of a vehicle incorporating a belt type continuously variable transmission applied with a control device and method according to a first embodiment.
Figure 2:
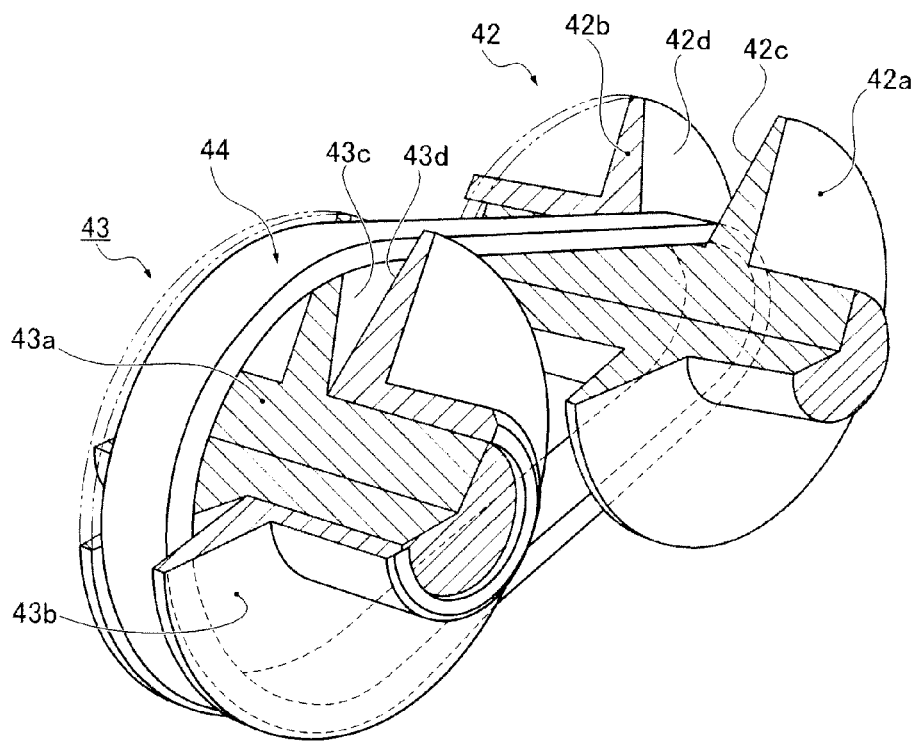
FIG. 2 is a perspective view of the belt type continuously variable transmission mechanism applied with the control device and method according to the first embodiment.
Figure 3:
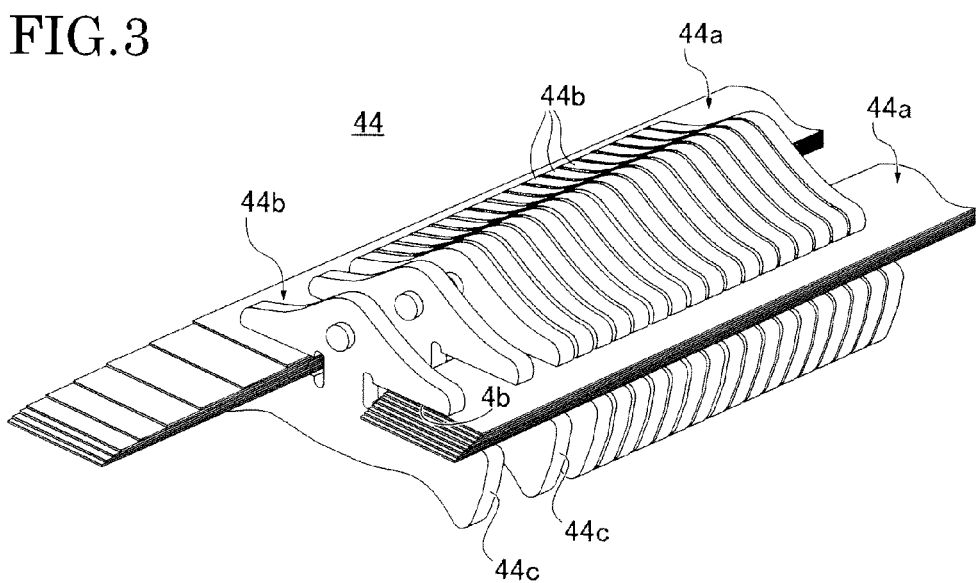
FIG. 3 is a perspective view of a part of a belt of the belt type continuously variable transmission mechanism applied with the control device and method according to the first embodiment.

First, the structure of the device is described. FIG. 1 shows the entire system of a drive system and a control system of a vehicle incorporating a belt type continuously variable transmission applied with a control device and method according to the first embodiment. FIG. 2 is a perspective view of the belt type continuously variable transmission mechanism applied with the control device and method according to the first embodiment. FIG. 3 is a perspective view of a part of a belt of a belt type continuously variable transmission mechanism applied with the control device and method according to the first embodiment. In the following the system structures are described with reference to FIGS. 1 to 3.

In FIG. 1 the drive system of a vehicle incorporating a belt type continuously variable transmission comprises an engine 1, a torque converter 2, a forward/backward drive switch mechanism 3, a belt type continuously variable transmission mechanism 4, a final reduction mechanism 5 and drive wheels 6, 6.

The output torque of the engine 1 is controllable by an engine control signal supplied from the exterior in addition to by a driver's acceleration operation. The engine 1 includes an output torque control actuator 10 to control the output torque by a throttle valve opening/closing operation, a fuel cut operation and the like.

The torque converter 2 is a startup element with a torque increasing function and includes a lockup clutch 20 that is capable of directly connecting an engine output shaft 11 (=torque converter input shaft) and a torque converter output shaft 21 when the torque increasing function is not needed. The torque converter 2 includes a turbine runner 23 connected with the engine output shaft 11 via a converter housing 22, a pump impeller 24 connected with the torque converter output shaft 21, and a stator 26 provided via a one-way clutch 25.

The forward/backward drive switch mechanism 3 switches a revolution direction input to the belt type continuously variable transmission mechanism 4 between a normal revolution direction during forward traveling and a reverse revolution direction during backward traveling. The forward/backward switch mechanism 3 includes a double pinion planetary gear 30, a forward clutch 31, and a backward brake 32. A sun gear of the double pinion planetary gear 30 is connected with the torque converter output shaft 21 and a carrier thereof is connected with a transmission input shaft 40. The forward clutch 31 is fastened during a forward traveling to directly connect the sun gear of the double pinion planetary gear 30 with the carrier. The backward brake 32 is fastened during a backward traveling to fix a ring gear of the double pinion planetary gear 30 to the case.

The belt type continuously variable transmission mechanism 4 has a continuously variable transmission function to steplessly change the gear ratio by changing a belt contact diameter. The gear ratio is a ratio of the input revolution speed of the transmission input shaft 40 and the output revolution speed of the transmission output shaft 41. The belt type continuously variable transmission mechanism 4 includes a primary pulley 42, a secondary pulley 43, and a belt 44. The primary pulley 42 is made up of a fixed pulley 42a and a slide pulley 42b. The slide pulley 42b is slid by primary hydraulic pressure introduced into a primary hydraulic pressure chamber 45. The secondary pulley 43 is made up of a fixed pulley 43a and a slide pulley 43b. The slide pulley 43b is slid by primary hydraulic pressure introduced into a secondary hydraulic pressure chamber 46. The belt 44 as shown in FIG. 2 is wound around V-form sheave faces 42c, 42d of the primary pulley 42 and V-form sheave faces 43c, 43d of the secondary pulley 43. In FIG. 3 the belt 44 is formed of two laminated rings 44a, 44a of which a large number of rings are layered from inside to outside as well as a large number of elements 44b of press-cut plates placed between the two laminated rings 44a, 44a and connected with each other in a ring-form. The elements 44b each includes, at both sides, flank faces 44c, 44c to contact with the sheave faces 42c, 42d of the primary pulley 42 and the sheave faces 43c, 43d of the secondary pulley 43.

The final reduction mechanism 5 decelerates the transmission output revolution from the transmission output shaft 41 of the belt type continuously variable transmission mechanism 4 and provides a differential function thereto to transmit it to the right and left drive wheels 6, 6. The final reduction mechanism 5 is interposed among the transmission output shaft 41, an idler shaft 50, right and left drive shafts 51, 51, and includes a first gear 52, a second gear 53, a third gear 54, and a fourth gear 55 with a deceleration function and a gear differential gear 56 with a differential function.

The control system of the belt type continuously variable transmission comprises a transmission hydraulic pressure control unit 7 and a CVT control unit 8, as shown in FIG. 1.

The transmission hydraulic pressure control unit 7 is a hydraulic pressure control unit to produce primary hydraulic pressure introduced into the primary hydraulic pressure chamber 45 and secondary hydraulic pressure introduced into the secondary hydraulic pressure chamber 46. The transmission hydraulic pressure control unit 7 comprises an oil pump 70, a regulator valve 71, a line pressure solenoid 72, a transmission control valve 73, a decompression valve 74, a secondary hydraulic pressure solenoid 75, a servo link 76, a transmission command valve 77, and a step motor 78.

The regulator valve 71 uses discharged pressure from the oil pump 70 as a pressure source to adjust line pressure PL. The regulator valve 71 includes the line pressure solenoid 72 to adjust the pressure of oil from the oil pump 70 to a predetermined line pressure PL in response to a command from the CVT control unit 8.

The transmission control valve 73 uses the line pressure PL produced by the regulator valve 71 as a pressure source to adjust the primary hydraulic pressure introduced into the primary hydraulic pressure chamber 45. A spool 73a of the transmission control valve 73 is connected with the servo link 76 constituting a mechanical feedback mechanism and the transmission command valve 77 connected with one end of the servo link 76 is driven by the step motor 78 so that the transmission command valve 77 receives feedback of a slide position (actual pulley ratio) from the slide pulley 42b of the primary pulley 42 connected with the other end of the servo link 76. That is, when changing gear, when the step motor 78 is driven in response to a command from the CVT control unit 8, the spool 73a of the transmission control valve 73 is changed in position to supply/discharge the line pressure PL to/from the primary hydraulic pressure chamber 45 to adjust the primary hydraulic pressure to acquire a target gear ratio commanded at the drive position of the step motor 78. Upon completion of changing gear, the spool 73a is held at a closed position in response to a displacement of the servo link 76.

The decompression valve 74 uses the line pressure PL produced by the regulator valve 71 as a pressure source to adjust the secondary hydraulic pressure introduced into the secondary hydraulic pressure chamber 46 by decompression. The decompression valve 74 comprises the secondary hydraulic pressure solenoid 75 to decompress the line pressure PL to a command secondary hydraulic pressure in accordance with a command from the CVT control unit 8.

The CVT control unit 8 is configured to perform various controls such as a gear ratio control to output to the step motor 78 a control command to acquire a target gear ratio in accordance with vehicle speed, throttle opening level and the like, a line pressure control to output to the line pressure solenoid 72 a control command to acquire a target line pressure in accordance with the throttle opening level or the like, a secondary hydraulic pressure control to output to the secondary hydraulic pressure solenoid 75 a control command to acquire a target secondary pulley thrust in accordance with transmission input torque or the like, a forward and backward switch control to control the fastening and release of the forward clutch 31 and backward brake 32, and a lockup control to control fastening and release of the lockup clutch 20. The CVT control unit 8 receives various sensor information and switch information from a primary revolution sensor 80, a secondary revolution sensor 81, a secondary hydraulic pressure sensor 82, an oil temperature sensor 83, an inhibitor switch 84, a brake switch 85, an accelerator opening sensor 86, and other sensors and switches 87. Further, it receives torque information from an engine control unit 88 and outputs a torque request to the engine control unit 88.

Figure 4:
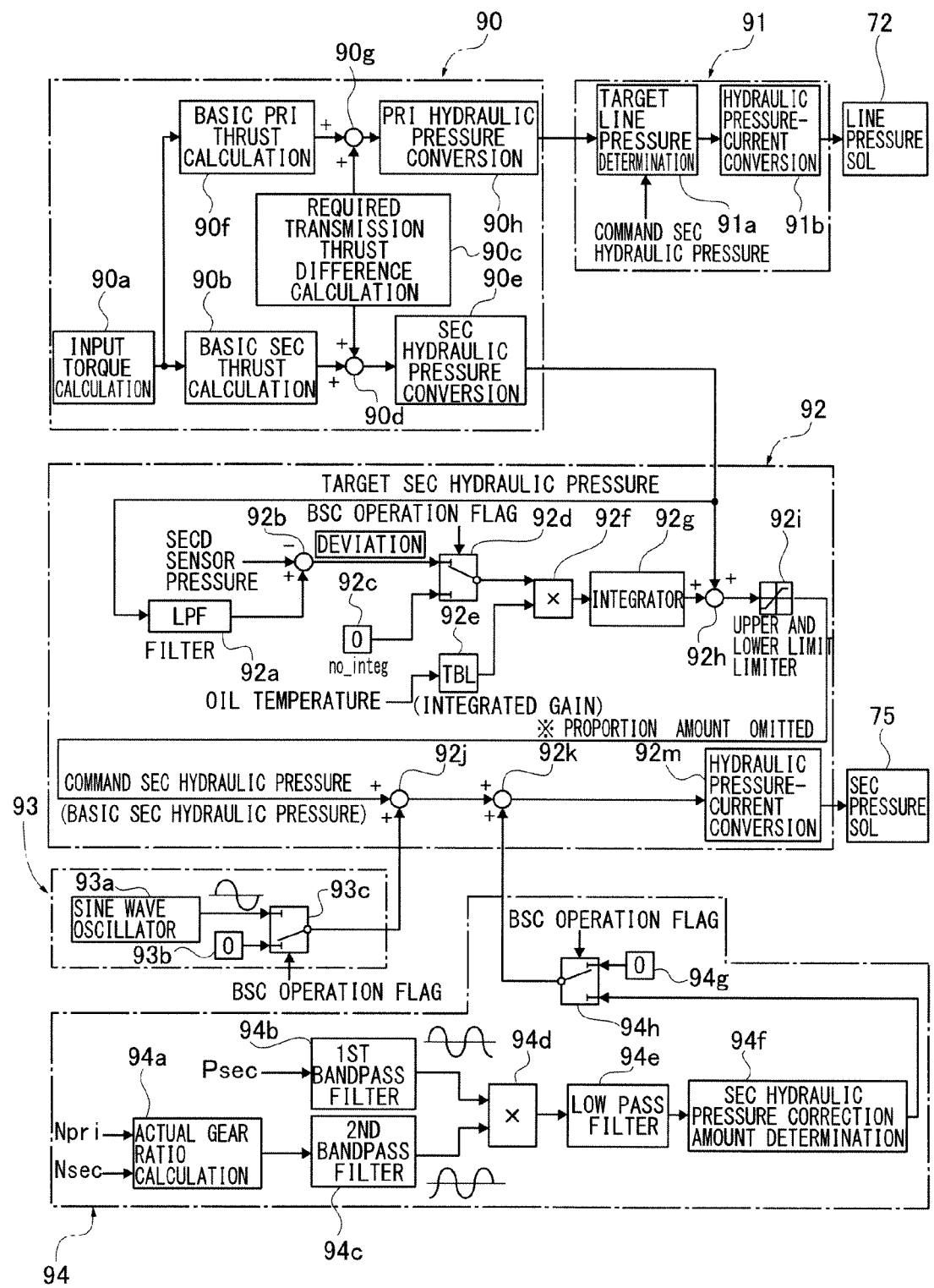
FIG. 4 is a control block diagram of the line pressure control and secondary hydraulic pressure control (normal control/belt slip control) executed by a CVT control unit 8 according to the first embodiment.

FIG. 4 is a control block diagram of the line pressure control and secondary hydraulic pressure control (normal control/belt slip control) executed by the CVT control unit 8 according to the first embodiment.

The hydraulic pressure control system of the CVT control unit 8 in the first embodiment comprises a basic hydraulic pressure calculator 90, a line pressure controller 91, a secondary hydraulic pressure controller 92, a sine wave oscillation controller 93 (oscillation amplitude setting means), and a secondary hydraulic pressure corrector 94, as shown in FIG. 4.

The basic hydraulic pressure calculator 90 includes an input torque calculator 90a to calculate transmission input torque on the basis of the torque information (engine speed, fuel injection time and the like) from the engine control unit 88 (FIG. 1), a basic secondary thrust calculator 90b to calculate a basic secondary thrust (belt clamp force necessary for the secondary pulley 43) from the transmission input torque obtained by the input torque calculator 90a, a required transmission thrust difference calculator 90c to calculate a thrust difference required for changing gear (a difference in belt clamp force between the primary and secondary pulleys 42, 43), a corrector 90d to correct the calculated basic secondary thrust on the basis of the required thrust difference for changing gear, and a secondary hydraulic pressure converter 90e to convert the corrected secondary thrust to a target secondary hydraulic pressure. It further includes a basic primary thrust calculator 90f to calculate a basic primary thrust (belt clamp force required for the primary pulley 42) from the transmission input torque calculated by the input torque calculator 90a, a corrector 90g to correct the calculated basic primary thrust on the basis of the required thrust difference for changing gear calculated by the required transmission thrust difference calculator 90c, and a primary hydraulic pressure converter 90h to convert the corrected primary thrust to a target primary hydraulic pressure.

The line pressure controller 91 includes a target line pressure determiner 91a to compare the target primary hydraulic pressure output from the primary hydraulic pressure converter 90h with the command secondary hydraulic pressure output from the secondary hydraulic pressure controller 92, and set the target line pressure to the target primary hydraulic pressure when the target primary hydraulic pressure≥the command secondary hydraulic pressure and set the target line pressure to the secondary hydraulic pressure when the target primary hydraulic pressure<the command secondary hydraulic pressure, and a hydraulic pressure-current converter 91b to convert the target line pressure determined by the target line pressure determiner 91a to a current value applied to the solenoid and output a command current value converted to the line pressure solenoid 72 of the regulator valve 71.

In the normal control the secondary hydraulic pressure controller 92 performs the feedback control (PI control) using the actual secondary hydraulic pressure detected by the secondary hydraulic pressure sensor 82 to acquire a command secondary hydraulic pressure, while in the belt slip control it performs open control without using the actual secondary hydraulic pressure to acquire the command secondary hydraulic pressure. It includes a low pass filter 92a through which the target secondary hydraulic pressure from the secondary hydraulic pressure converter 90e is filtered, a deviation calculator 92b to calculate a deviation between the actual secondary hydraulic pressure and the target secondary hydraulic pressure, a zero deviation setter 92c to set the deviation to zero, a deviation switch 92d to selectively switch between the calculated deviation and zero deviation, and an integrated gain determiner 92e to determine an integrated gain from oil temperature. Further, it includes a multiplier 92f to multiply the integrated gain from the integrated gain determiner 92e and the deviation from the deviation switch 92d, an integrator 92g to integrate an FB integration control amount from the multiplier 92f, an adder 92h to add the integrated FB integration control amount to the target secondary hydraulic pressure from the secondary hydraulic pressure converter 90e, and a limiter 92i to set upper and lower limits to the added value to obtain the command secondary hydraulic pressure (referred to as basic secondary hydraulic pressure in the belt slip control). Further, it includes an oscillation adder 92j to add a sine wave oscillation command to the basic secondary hydraulic pressure in the belt slip control, a hydraulic pressure corrector 92k to correct the oscillated basic secondary hydraulic pressure by a secondary hydraulic pressure correction amount to the command secondary hydraulic pressure, and a hydraulic pressure-current converter 92m to convert the command secondary hydraulic pressure into a current value applied to the solenoid to output a command current value converted to the secondary hydraulic pressure solenoid 75. Note that the deviation switch 92d is configured to select the calculated deviation when a BSC operation flag is 0 (during the normal control) and select the zero deviation when the BSC operation flag is 1 (during the belt slip control).

The sine wave oscillation controller 93 includes a sine wave oscillator 93a to decide an oscillation frequency and an oscillation amplitude suitable for the belt slip control and apply sine wave hydraulic pressure oscillation in accordance with the decided frequency and amplitude, a zero oscillation setter 93b to apply no sine wave hydraulic pressure oscillation, and an oscillation switch 93c to selectively switch between the hydraulic pressure oscillation and zero oscillation. Note that the oscillation switch 93c is configured to select the zero oscillation when the BSC operation flag is 0 (during the normal control) and select the sine wave hydraulic pressure oscillation when the BSC operation flag is 1 (during the belt slip control). Here, the oscillation amplitude, on the basis of a later-described point of view, in the gear ratio range where the belt slip control is performed, is set to an optimum value that is capable of achieving an improvement of fuel efficiency performance and ensuring detection performance of a belt slip rate.

The secondary hydraulic pressure corrector 94 includes an actual gear ratio calculator 94a to calculate an actual gear ratio Ratio from a ratio of the primary revolution speed Npri of the primary revolution sensor 80 and the secondary revolution speed Nsec of the secondary revolution sensor 81, a first bandpass filter 94b to extract an oscillation component from a signal representing the actual secondary hydraulic pressure Psec obtained with the secondary hydraulic pressure sensor 82, and a second bandpass filter 94c to extract an oscillation component from the calculated data by the actual gear ratio calculator 94a. It further includes a multiplier 94d to multiply the oscillation components extracted by both bandpass filters 94b, 94c, a low pass filter 94e to extract phase difference information from the multiplication result, a secondary hydraulic pressure correction amount determiner 94f to determine a secondary hydraulic pressure correction amount on the basis of the phase difference information from the low pass filter 94e, a zero correction amount setter 94g to set the secondary hydraulic pressure correction amount to zero, and a correction amount switch 94h to selectively switch between the secondary hydraulic pressure correction amount and the zero correction amount. Note that the correction amount switch 94h is configured to select the zero correction amount when the BSC operation flag is 0 (during the normal control) and select the secondary hydraulic pressure correction amount when the BSC operation flag is 1 (during the belt slip control).

Figure 5:
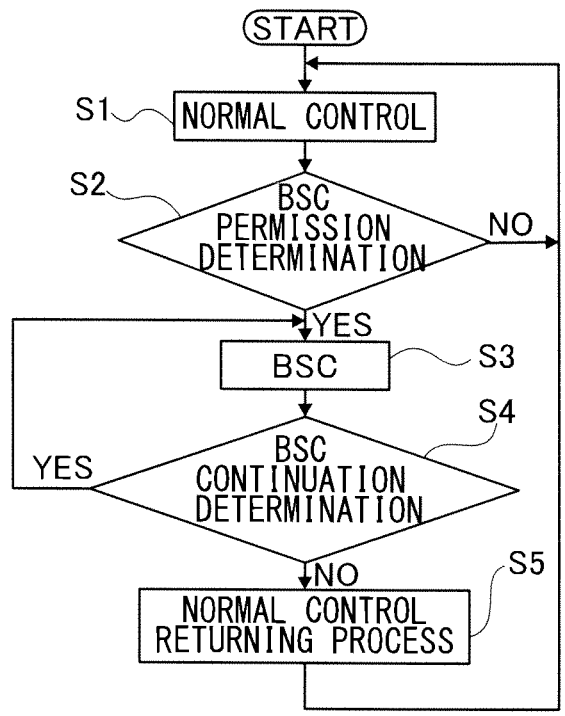
FIG. 5 is a basic flowchart for a switching process between the normal control and the belt slip control (=BSC) over the secondary hydraulic pressure executed by the CVT control unit 8 according to the first embodiment.

FIG. 5 is a basic flowchart for a switching process between the normal control and the belt slip control (=BSC) over the secondary hydraulic pressure executed by the CVT control unit 8 according to the first embodiment. In the following the respective steps in FIG. 5 are described.

In step S1 following a startup by turning-on of the key, the determination on non-BSC permission in step S2 or normal control returning process in step S5, the belt type continuously variable transmission mechanism 4 is normally controlled, and then the flow proceeds to step S2. During the normal control, the BSC operation flag is set to zero, and a secondary pressure F/B inhibition flag is set to zero.

In step S2 following the normal control in step S1, a determination is made on whether or not all of the following BSC permission conditions are satisfied. If the result is YES (all the BSC permission conditions satisfied), the flow proceeds to step S3, and the belt slip control (BSC) is performed. If the result is NO (any of the BSC permission conditions unsatisfied), the flow returns to step S1, and the normal control is continued. An example of the BSC permission conditions is as follows:

(1) The transmitted torque capacity of the belt type continuously variable transmission mechanism 4 is stable (a change rate of the transmitted torque capacity is small).

This condition (1) is determined by satisfaction of the following two conditions, for example.

a. |command torque change rate|<predetermined value
b. |command gear ratio change rate|<predetermined value (2) The estimated accuracy of the input torque to the primary pulley 42 is within a reliable range.

This condition (2) is, for example, determined on the basis of the torque information (estimated engine torque) from the engine control unit 88, the lockup state of the torque converter 2, the operation state of a brake pedal, a range position and the like.

(3) The permitted conditions in the above (1) (2) are continued for a predetermined length of time.

In step S2, whether or not the above conditions (1), (2), (3) are all satisfied is determined.

In step S3 following the BSC permission determination in step S2 or the BSC continuation determination in step S4, the belt slip control (FIG. 6 to FIG. 8) is performed to reduce an input to the belt 44 of the belt type continuously variable transmission mechanism 4 and maintain the belt 44 in an appropriate slip state without slippage. Then, the flow proceeds to step S4. During the belt slip control the operation flag is set to 1, and the secondary pressure F/B inhibition flag is set to 1.

In step S4 following the belt slip control in step S3, a determination is made on whether or not all of the following BSC continuation conditions are satisfied. If the result is YES (all the BSC continuation conditions satisfied), the flow returns to step S3, and the belt slip control (BSC) is continued. If the result is NO (any of the BSC continuation conditions unsatisfied), the flow proceeds to step S5, and the normal control returning process is performed. An example of the BSC continuation conditions is as follows:

(1) The transmitted torque capacity of the belt type continuously variable transmission mechanism 4 is stable (a change rate of the transmitted torque capacity is small).

This condition (1) is determined by satisfaction of the following two conditions, for example.

a. |command torque change rate|<predetermined value
b. |command gear ratio change rate|<predetermined value
(2) The estimated accuracy of the input torque to the primary pulley 42 is within a reliable range.

This condition (2) is, for example, determined on the basis of the torque information (estimated engine torque) from the engine control unit 88, the lockup state of the torque converter 2, the operation state of a brake pedal, a range position and the like. Whether or not the above conditions (1), (2) are both satisfied is determined. That is, a difference between the BSC permission conditions and the BSC continuation conditions is in that the BSC continuation conditions exclude the continuation condition (3) of the BSC permission conditions.

In step S5 following a determination that any of the BSC continuation conditions is unsatisfied, the normal control returning process (FIG. 9 to FIG. 11) is performed to prevent the belt 4 from slipping when the belt slip control is returned to the normal control. Upon completion of the process, the flow returns to step S1 and shifts to the normal control.

Figure 6:
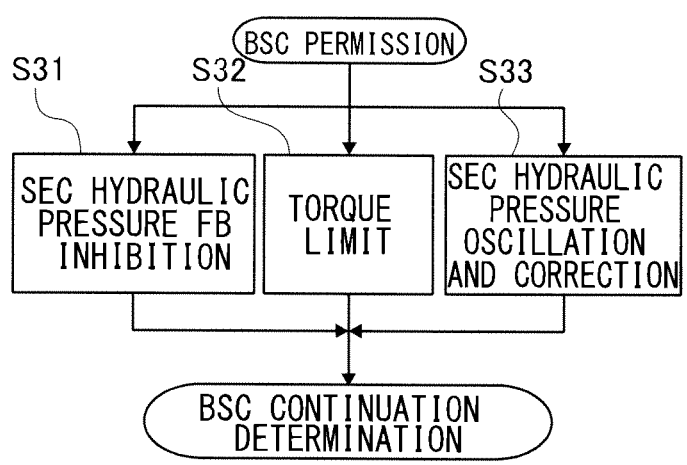
FIG. 6 is a flowchart for the entire belt slip control process executed by the CVT control unit 8 according to the first embodiment.
Figure 7:
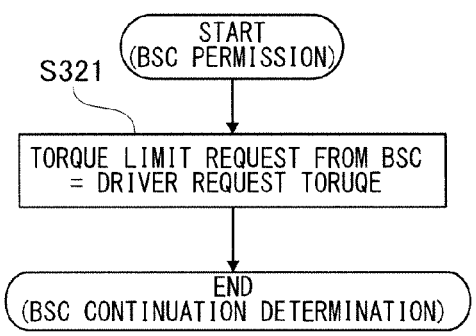
FIG. 7 is a flowchart for the torque limit process of the belt slip control process executed by the CVT control unit 8 according to the first embodiment.
Figure 8:
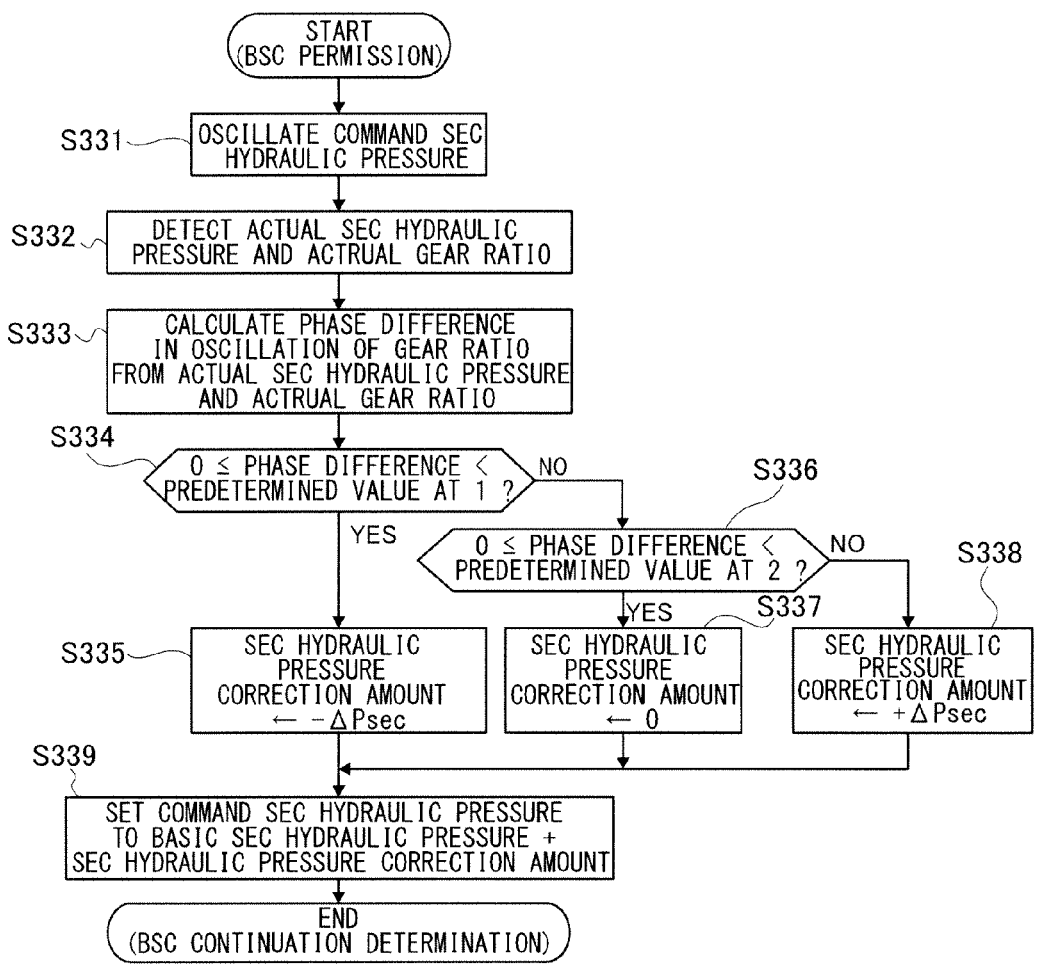
FIG. 8 is a flowchart for the secondary hydraulic pressure oscillation and correction process of the belt slip control process executed by the CVT control unit 8 according to the first embodiment.

FIG. 6 is a flowchart for the entire belt slip control process executed by the CVT control unit 8 according to the first embodiment. FIG. 7 is a flowchart for the torque limit process of the belt slip control process executed by the CVT control unit 8 according to the first embodiment. FIG. 8 is a flowchart for the secondary hydraulic pressure oscillation and correction process of the belt slip control process executed by the CVT control unit 8 according to the first embodiment.

First, as is apparent from FIG. 6, during the belt slip control in which the BSC permission determination and the BSC continuation determination are continued, a feedback control inhibition process (step S31) in which the command secondary hydraulic pressure is obtained using the actual secondary hydraulic pressure, a torque limit process (step S32) as a preparation for returning to the normal control, and a secondary hydraulic pressure oscillation and correction process (step S33) for the belt slip control are concurrently performed.

In step S31 during the belt slip control in which the BSC permission determination and the BSC continuation determination are continued, the feedback control under which the command secondary hydraulic pressure is obtained using the actual secondary hydraulic pressure detected by the secondary hydraulic pressure sensor 82 is inhibited.

That is, for obtaining the command secondary hydraulic pressure, the feedback control during the normal control is inhibited and switched to the open control of the belt slip control using the zero deviation. Then, when the belt slip control is shifted to the normal control, the feedback control returns again.

In step S32 during the belt slip control in which the BSC permission determination and the BSC continuation determination are continued, the torque limit process in FIG. 7 is performed.

That is, in step S321 of the flowchart in FIG. 7 a "torque limit request from the belt slip control" is defined to be the driver request torque.

In step S33 during the belt slip control in which the BSC permission determination and the BSC continuation determination are continued, the secondary hydraulic pressure is oscillated and corrected in FIG. 8. In the following the steps of the flowchart in FIG. 8 are described.

In step S331 the command secondary hydraulic pressure is oscillated. That is, the sine wave hydraulic pressure with predetermined amplitude and predetermined frequency is superposed on the command secondary hydraulic pressure. The flow proceeds to step S332.

In step S332 following the oscillation of the command secondary hydraulic pressure in step S331, the actual secondary hydraulic pressure is detected with the secondary hydraulic pressure sensor 82 to detect the actual gear ratio by calculation based on information on the revolution speed from the primary revolution sensor 80 and the secondary revolution sensor 81. The flow proceeds to step S333.

In step S333 following the detection of the actual secondary hydraulic pressure and the actual gear ratio in step S332, the actual secondary hydraulic pressure and the actual gear ratio are each subjected to the bandpass filter process to extract their respective oscillation components (sine wave) and multiply them. Then, the multiplied value is subjected to the low pass filter process and converted to a value expressed by oscillation amplitude and a phase difference θ (cosine wave) between the oscillation of the actual secondary hydraulic pressure and that of the actual gear ratio. The flow proceeds to step S334. Herein, where A is the oscillation amplitude of the actual secondary hydraulic pressure and B is the oscillation amplitude of the actual gear ratio, the oscillation of the actual secondary hydraulic pressure is expressed by the formula (1): A sin ωt. The oscillation of the actual speed-change ratio is expressed by the formula (2): B sin (ωt+θ). The formulas (1) and (2) are multiplied, and using the following product sum formula (3):

$$\sin \alpha \sin \beta = -\frac{1}{2}\{\cos(\alpha+\beta)-\cos(\alpha-\beta)\}$$

the following formula (4):

$$A \sin \omega t \times B \sin(\omega t+\theta)=(\tfrac{1}{2})AB \cos \theta-(\tfrac{1}{2})AB \cos(2\omega t+\theta)$$

is obtained.

In the formula (4), (½)AB cos(2ω+θ) as the double component of the oscillation frequency is reduced through the low pass filter so that the formula (4) becomes the following formula (5):

$$A \sin \omega t \times B \sin(\omega t+\theta) \approx (\tfrac{1}{2})Ab \cos \theta$$

Thus, it can be expressed by the formula of the oscillation amplitude A, B and the phase difference θ between the oscillation of the actual secondary hydraulic pressure and that of the actual gear ratio.

In step S334 following the calculation of the phase difference θ between the oscillation of the actual secondary hydraulic pressure and that of the actual gear ratio in step S333, a determination is made on whether or not the phase difference θ is such that 0≤phase difference θ<predetermined value at 1 (micro slip range). If the result is YES (0≤phase difference θ<predetermined value at 1), the flow proceeds to step S335, while if the result is NO (predetermined value at 1≤phase difference θ), the flow proceeds to step S336.

In step S335 following the determination that the 0≤phase difference θ<predetermined value at 1 (micro slip range) in step S334, the secondary hydraulic pressure correction amount is set to −ΔPsec. The flow proceeds to step S339.

In step S336 following the determination that the predetermined value at 1≤phase difference θ in step S334, a determination is made on whether or not the phase difference θ is such that predetermined value at 1≤phase difference θ<predetermined value at 2 (target slip range). At the result being YES (predetermined value at 1≤phase difference θ<predetermined value at 2), the flow proceeds to step S337 while at the result being NO (predetermined value at 2≤phase difference θ), the flow proceeds to step S338.

In step S337 following the determination on predetermined value at 1≤phase difference θ<predetermined value at 2 (target slip range) in step S336, the secondary hydraulic pressure correction amount is set to zero and the flow proceeds to step S339.

In step S338 following the determination on predetermined value at 2≤phase difference θ (micro/macro slip transition range) in step S336, the secondary hydraulic pressure correction amount is set to +ΔPsec and the flow proceeds to step S339.

In step S339 following the setting of the secondary hydraulic pressure correction amounts in steps S335, S337, S338, the command secondary hydraulic pressure is set to the value of the basic secondary hydraulic pressure+secondary hydraulic pressure correction amount. Then, the flow proceeds to END.

Figure 9:
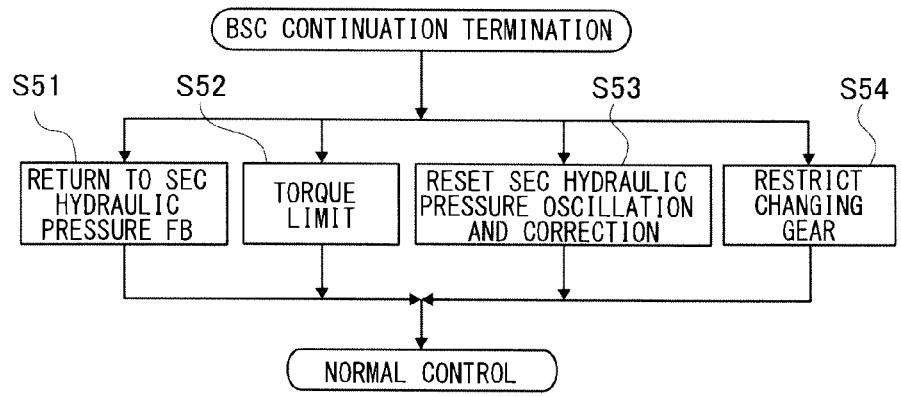
FIG. 9 is a flowchart for a returning process from the belt slip control to the normal control executed by the CVT control unit 8 according to the first embodiment.
Figure 10:
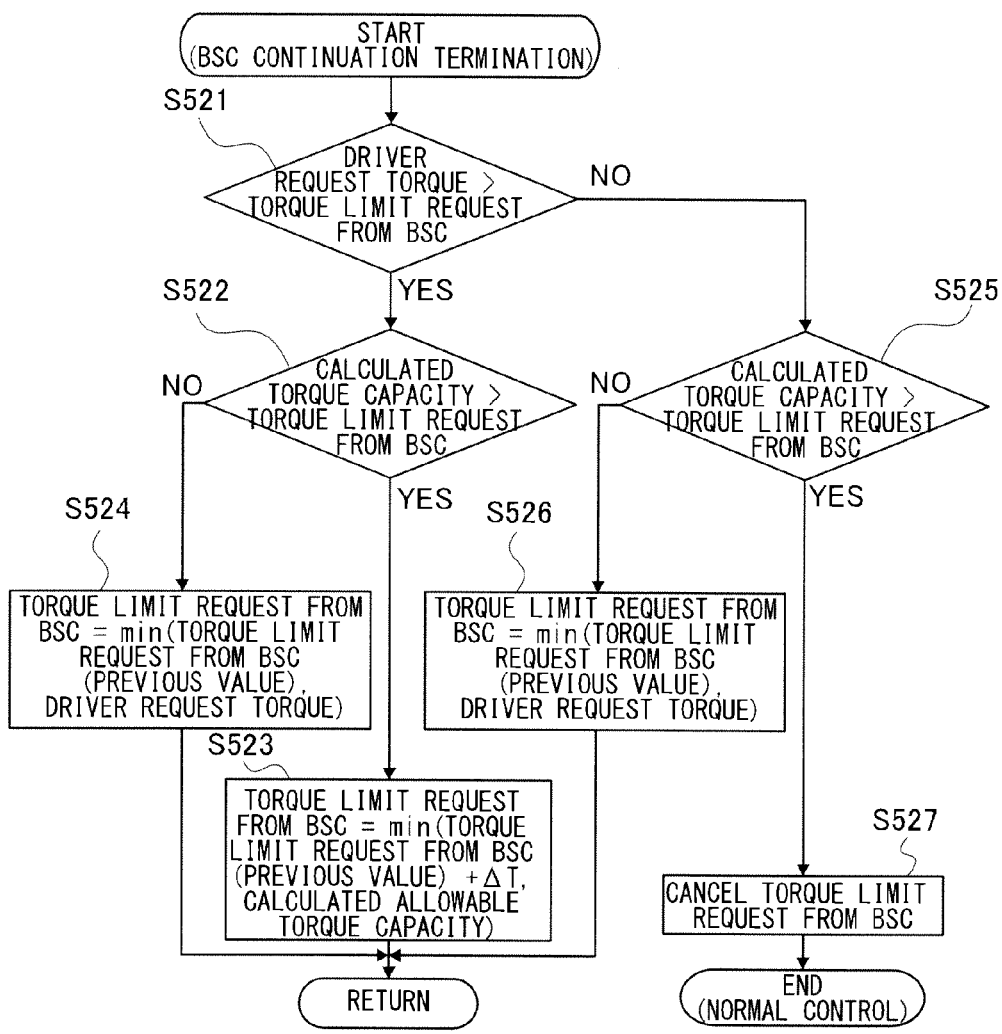
FIG. 10 is a flowchart for the torque limit process of the returning process to the normal control executed by the CVT control unit 8 according to the first embodiment.
Figure 11:
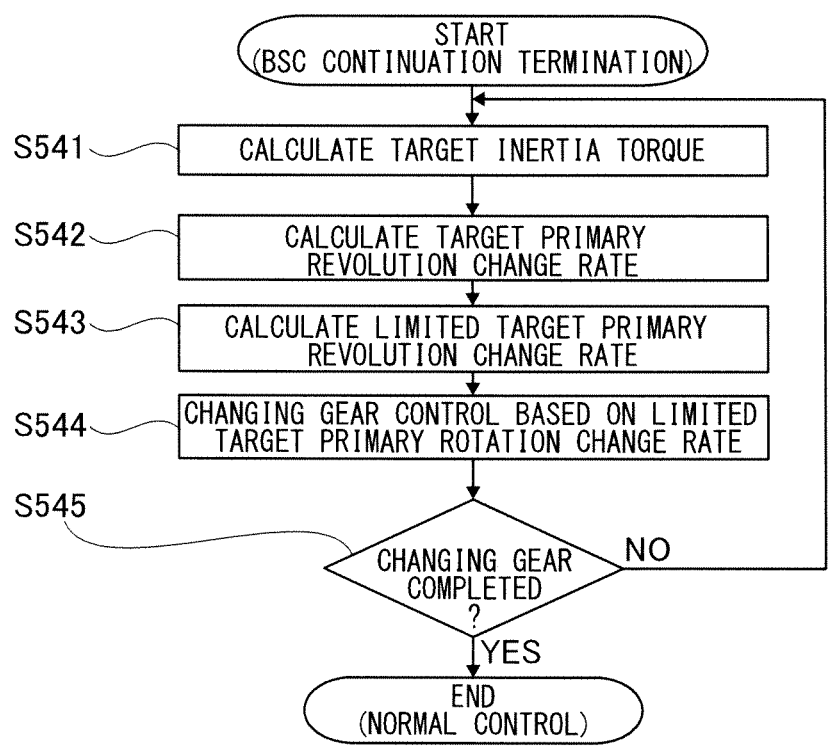
FIG. 11 is a flowchart for a gear ratio changing speed limit process that sets a limit on the number of a target primary revolution speed of the returning process to the normal control executed by the CVT control unit 8 according to the first embodiment.

FIG. 9 is a flowchart for a returning process from the belt slip control to the normal control executed by the CVT control unit 8 according to the first embodiment. FIG. 10 is a flowchart for the torque limit process of the returning process to the normal control executed by the CVT control unit 8 according to the first embodiment. FIG. 11 is a flowchart for a gear ratio changing speed limit process that sets a limit to the target primary revolution speed of the returning process to the normal control executed by the CVT control unit 8 according to the first embodiment.

First, as is apparent from FIG. 9, while the normal control is returned from the belt slip control from the BSC continuation termination to the start of the normal control, a feedback control returning process (step S51) in which the command secondary hydraulic pressure is obtained using the actual secondary hydraulic pressure, a torque limit process (step S52) as a preparation for returning to the normal control, an oscillation and correction secondary hydraulic pressure resetting process (step S53) for the belt slip control, and a changing gear restricting process (step S54) in which the changing gear speed is restricted are concurrently performed.

In step S51, while the normal control is returned from the belt slip control from the BSC continuation termination to the start of the normal control, the feedback control in which the command secondary hydraulic pressure is obtained using the actual secondary hydraulic pressure detected by the secondary hydraulic pressure sensor 82 is returned.

In step S52 while the normal control is returned from the belt slip control from the BSC continuation termination to the start of the normal control, the torque limit process as a preparation for returning to the normal control in FIG. 10 is performed.

In step S53 while the normal control is returned from the belt slip control from the BSC continuation termination to the start of the normal control, the secondary hydraulic pressure oscillation and correction in FIG. 8 is reset to wait for the normal control.

In step S54 while the normal control is returned from the belt slip control from the BSC continuation termination to the start of the normal control, the changing gear restricting process in FIG. 11 in which the changing gear speed is restricted is performed.

In the following the steps of the flowchart showing the torque limit process in FIG. 10 are described. The key point of this torque limit process is to switch the controls on the basis of a magnitude relationship among the three values of driver request torque, torque limit request from the BSC, and torque capacity (calculated torque capacity). Herein, the driver request torque refers to an engine torque requested by a driver, and torque limit request from the BSC refers to torque limit amount shown in the phases (2), (3) in FIG. 13. Torque capacity is generally an allowable designed torque capacity and set to a value higher than the driver request torque by a margin with mechanical variation of the belt type continuously variable transmission mechanism 4 taken into consideration, for the purpose of preventing belt slip. Herein, the actual torque capacity is controlled under the secondary hydraulic pressure control. Further, the calculated torque capacity refers to a torque capacity during the BSC (phase (2) in FIG. 13) and the returning process (phase (3) in FIG. 13). The calculated torque capacity is specifically a value based on or calculated from the actual secondary hydraulic pressure and the actual gear ratio (torque capacity of one of the two pulleys 42, 43 to which engine torque is input, that is, the primary pulley 42).

In step S521 a determination is made on whether or not the driver request torque is larger than the torque limit request from the BSC. If the result is YES, the flow proceeds to step S522, while if the result is NO, the flow proceeds to step S525.

In step S522 following the determination that the driver request torque is larger than the torque limit request from the BSC in step S521, a determination is made on whether or not the calculated torque capacity is larger than the torque limit request from the BSC. If the result is YES, the flow proceeds to step S523, while if the result is NO, the flow proceeds to step S524.

In step S523 following the determination that the calculated torque capacity>the torque limit request from the BSC in step S522, the torque limit request from the BSC is set to a smaller one of the torque limit request from the BSC (previous value)+ΔT and the calculated allowable torque capacity. The flow proceeds to RETURN.

In step S524 following the determination that the calculated torque capacity≤the torque limit request from the BSC in step S522, the torque limit request from the BSC is set to a smaller one of the torque limit request from the BSC (previous value) and the driver request torque. The flow proceeds to RETURN.

In step S525 following the determination that the driver request torque≤the torque limit request from the BSC in step S521, a determination is made on whether or not the calculated torque capacity is larger than the torque limit request from the BSC. If the result is YES, the flow proceeds to step S527, while if the result is NO, the flow proceeds to step S526.

In step S526 following the determination that the calculated torque capacity≤the torque limit request from the BSC in step S525, the torque limit request from the BSC is set to a smaller one of the torque limit request from the BSC (previous value) and the driver request torque. The flow proceeds to RETURN.

In step S527 following the determination that the calculated torque capacity>the torque limit request from the BSC in step S525, the torque limit request from the BSC is cancelled. The flow proceeds to END.

In the following steps of the flowchart showing the gear ratio changing speed limit process that sets a limit to the target primary revolution speed in FIG. 11 are described.

In step S541 a target inertia torque is calculated from the engine torque. The flow proceeds to step S542.

In step S542 following the calculation of the target inertia torque in step S541, a target primary revolution change rate is calculated from the target inertia torque. Then, the flow proceeds to step S543.

In step S543 following the calculation of the target primary revolution change rate in step S542, a limited target primary revolution speed not exceeding the target primary revolution change rate is calculated, and the flow proceeds to step S544.

In step S544 following the calculation of the limited target primary revolution change rate in step S543, changing gear control is performed on the basis of the limited target primary revolution speed, and the flow proceeds to step S545.

In step S545 following the changing gear control in step S544, a determination is made on whether or not the changing gear control based on the limited target primary revolution speed is completed or the actual primary revolution speed has reached the limited target primary revolution speed. If the result is YES (completion of changing gear control), the flow ends, while if the result is NO (in the middle of changing gear control), the flow returns to step S541.

Next, the operation of the control device and method for the belt type continuously variable transmission mechanism 4 according to the first embodiment is described. It will be divided into five parts; namely, BSC permission and continuation determining operations, belt slip control operation (BSC operation), torque limit operation in returning control from BSC to normal control, primary revolution increase rate limit operation in returning control from BSC to normal control, and setting operation of oscillation amplitude of secondary hydraulic pressure during BSC.

[BSC Permission and Continuation Determining Operations]

At a start of the vehicle's running, the operation proceeds to step S2 from step S1 in the flowchart in FIG. 5. Unless all the BSC permission determining conditions are satisfied in step S2, the flow from step S1 to step S2 is repeated to continue the normal control. That is, the satisfaction of all the BSC permission determining conditions in step S2 is defined to be BSC control starting condition.

The BSC permission conditions in the first embodiment are as follows:

(1) The transmitted torque capacity of the belt type continuously variable transmission mechanism 4 is stable (a change rate of the transmitted torque capacity is small).

This condition (1) is determined by satisfaction of the following two conditions, for example.

a. |command torque change rate|<predetermined value
b. |command gear ratio change rate|<predetermined value (2) The estimated accuracy of the input torque to the primary pulley 42 is within a reliable range.

This condition (2) is for example determined on the basis of the torque information (estimated engine torque) from the engine control unit 88, the lockup state of the torque converter 2, the operation state of a brake pedal, a range position and the like.

(3) The permitted conditions in the above (1) (2) are continued for a predetermined length of time.

In step S2, whether or not the above conditions (1), (2), (3) are all satisfied is determined.

Thus, the belt slip control is allowed to start if the transmission torque capacity of the belt type continuously variable transmission mechanism 4 continues to be stable and the estimated accuracy of the input torque to the primary pulley 42 is continuously within a reliable range for a predetermined length of time during the normal control.

As above, the belt slip control is permitted to start upon the satisfaction of all the BSC permission conditions so that it is able to start the belt slip control in a preferable range with an assured high control precision.

After the BSC permission is determined in step S2, in step S3 the belt slip control is performed to reduce an input to the belt 44 of the belt type continuously variable transmission mechanism 4 and maintain the belt 44 in an appropriate slip state without slippage. Then, in step S4 following the belt slip control in step S3, a determination is made on whether or not all of the BSC continuation conditions are satisfied. As long as all of the BSC continuation conditions are satisfied, the flow from step S3 to step S4 is repeated to continue the belt slip control (BSC).

Here, the BSC continuation conditions are the BSC permission conditions (1), (2) and exclude the continuation condition for a predetermined length of time (3) of the BSC permission conditions.

Because of this, it is made possible to prevent continuation of the belt slip control with unsecured control precision since the belt slip control is immediately stopped and returned to the normal control if one of the conditions (1), (2) is unsatisfied during the belt slip control.

[Belt Slip Control Operation (BSC Operation)]

At the start of the belt slip control, the secondary hydraulic pressure is set to a value to acquire the clamp force not to cause belt slippage with an estimated safety factor so that the condition that the phase difference θ is lower than the predetermined value at 1 is satisfied. In the flowchart in FIG. 8 the flow from step S331→step S332→step S333→step S334→step S335 to step S339 is repeated and every time the flow is repeated, the command secondary hydraulic pressure is decreased in response to the correction by −ΔPsec. Then, until the phase difference θ at 1 or more reaches the predetermined value at 2, the flow proceeds from step S331→step S332→step S333→step S334→step S336→step S337 to step S339 in FIG. 8 to maintain the command secondary hydraulic pressure. At the phase difference θ being the predetermined value at 2 or more, the flow proceeds from step S331→step S332→step S333→step S334→step S336→step S338 to step S339 to increase the command secondary hydraulic pressure in response to the correction by +ΔPsec.

Under the belt slip control the slip rate is maintained so that the phase difference θ falls within the range of the predetermined values from 1 or more to less than 2.

The belt slip control is described with reference to the timing chart in FIG. 12. At time t1, the above BSC permission conditions (1), (2) are satisfied and continued (BSC permission condition (3)). After reaching time t2, from time t2 to time t3, at least one of the above BSC continuation conditions (1), (2) becomes unsatisfied, and the BSC operation flag and SEC pressure F/B inhibiting flag (secondary pressure feedback inhibiting flag) are set for the belt slip control. A little before time t3 the accelerator is pressed, so that at least one of the BSC continuation conditions becomes unsatisfied and the control to return to the normal control is performed from time t3 to time t4. After time t4, the normal control is performed.

Figure 12:
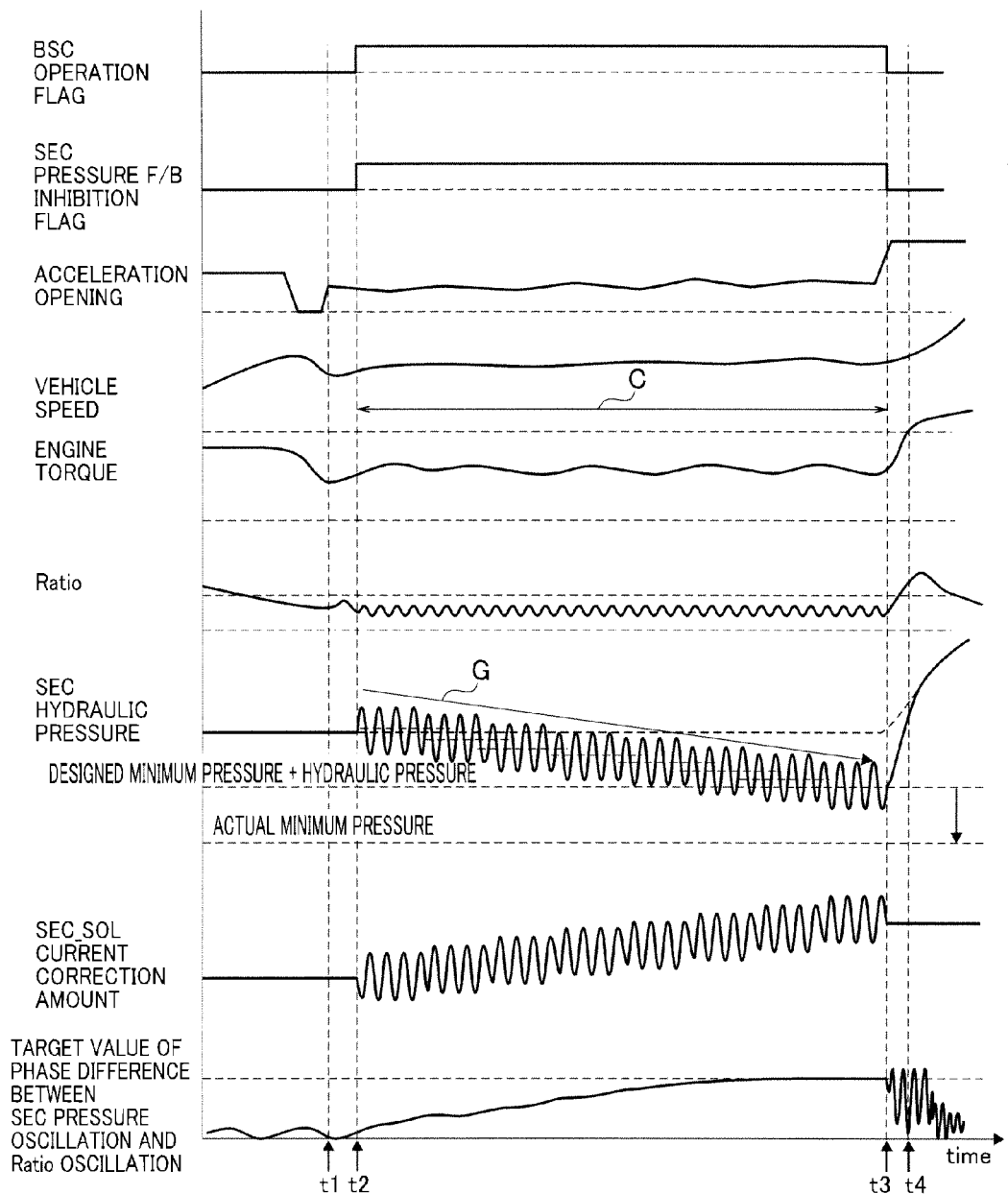
FIG. 12 is a timing chart of the respective characteristics of a BSC operation flag, SEC pressure F/B inhibition flag, accelerator opening, vehicle speed, engine torque, Ratio, SEC hydraulic pressure, SEC_SOL current correction amount, and phase difference between SEC pressure oscillation and Ratio oscillation in a traveling scene during a control shift from the normal control, belt slip control, returning control to the normal control.

Thus, as is apparent from the accelerator opening characteristic, vehicle speed characteristic, and engine torque characteristic as well as the solenoid current correction amount characteristic of the secondary hydraulic pressure solenoid 75 during steady running determination indicated by the arrow C in FIG. 12, under the belt slip control the phase difference θ between the oscillation components of the secondary hydraulic pressure due to the oscillation and the gear ratio is monitored to increase or decrease the current value. Note that the secondary hydraulic pressure solenoid 75 is normally open (always open) and decreases the secondary hydraulic pressure along with a rise of the current value.

The actual gear ratio is maintained to be virtually constant by the belt slip control, although it oscillates with small amplitude as shown in the actual gear ratio characteristic (Ratio) in FIG. 12. The phase difference θ, as shown in the phase difference characteristics of the SEC pressure oscillation and Ratio oscillation in FIG. 12, gradually increases with time from time t2 when the slip rate is approximately zero, and reaches a target value (target slip rate). The secondary hydraulic pressure as shown in the SEC hydraulic pressure characteristic in FIG. 12 decreases with time from time t2 when the safety factor is secured, as indicated by the arrow G, and reaches a value of the designed minimum pressure added with hydraulic pressure oscillation amplitude in the end which is in the hydraulic pressure level with a margin to the actual minimal pressure. While the belt slip control continues for a long time, the actual secondary hydraulic pressure is maintained in the range of the designed minimum pressure plus hydraulic pressure oscillation amplitude to maintain the target value of the phase difference θ (of slip rate).

Thus, a decrease in the secondary hydraulic pressure by the belt slip control results in reducing the belt friction acting on the belt 44 and reducing the drive load on the belt type continuously variable transmission mechanism 4 by the reduction in the belt friction. As a result, it is possible to improve the practical fuel efficiency of the engine 1 without affecting the travelling performance during the belt slip control based on the BSC permission determination.

[Torque Limit Operation in Returning Control from BSC to Normal Control]

During the belt slip control while the BSC permission and continuation determinations are continued, the torque limit process in step S321 in FIG. 7 is performed by setting the torque limit request from the belt slip control as the driver request torque in step S321 in FIG. 7. In the following the torque limit operation for retuning to the normal control is described with reference to FIG. 10 and FIG. 13.

The engine control unit 88 has a torque limit amount as an engine torque control upper limit, and controls the actual torque of the engine 1 not to exceed the torque limit amount. This torque limit amount is determined according to various requests. For example, the input torque upper limit to the belt type continuously variable transmission mechanism 4 during the normal control (phase (1) in FIG. 13) is set to the torque limit request during the normal control, and the CVT control unit 8 sends the torque limit request during the normal control to the engine control unit 88. The engine control unit 88 selects the minimum one of torque limit requests from various controllers as the torque limit amount.

Figure 13:
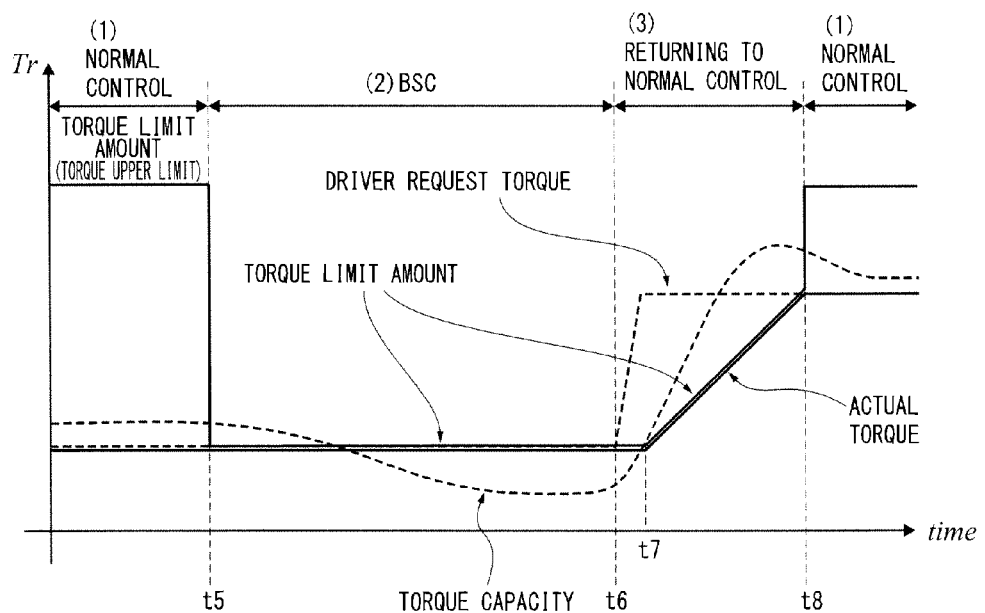
FIG. 13 is a timing chart of the respective characteristics of driver request torque, torque limit amount, torque capacity, and actual torque to explain a torque limit operation by torque delay applied in the returning control from the belt slip control to the normal control according to the first embodiment

Specifically, at time t5 the phase (1) of the normal control is shifted into the belt slip control, and the torque limit request from the BSC is sent to the engine control unit 88 in the phase (2) as shown in the torque limit amount characteristic in FIG. 13. However, the torque limit request from the BSC during the BSC (phase (2) in FIG. 13) is for preparation in advance for the torque limiting in FIG. 10 and does not virtually function as a torque limit during the BSC (phase (2) in FIG. 13).

Then, at time t6 the BSC continuation is aborted and shifted into the control to return to the normal control. At time t6 a torque limit request is issued because of the driver request torque>torque limit request from the BSC and the calculated torque capacity≤torque limit request from the BSC. Therefore, the flow from step S521→step S522→step S524 to RETURN in the flowchart in FIG. 10 is repeated to maintain the torque limit request from the BSC (previous value) in step S524.

Thereafter, at time t7 the driver request torque>torque limit request from the BSC and the calculated torque capacity>torque limit request from the BSC. The flow from step S521→step S522→step S523 to RETURN in the flowchart in FIG. 10 is repeated. In step S523, the torque limit request from the BSC is (previous value+ΔT), and a characteristic is shown such that the torque limit request from the BSC gradually rises. Along with this rising gradient, the actual torque gradually rises.

Due to the rise of the torque limit request from the BSC since time t7, at time t8 the driver request torque≤torque limit request from the BSC and the calculated torque capacity>torque limit request from the BSC. The flow proceeds from step S521→step S525→step S527 to END in the flowchart in FIG. 10. In step S527 the torque limit from the BSC is cancelled.

In this example the flow skips step S526 which is executed when the accelerator is manipulated as stepped on or returned (released) for a short period of time. Specifically, step S526 is skipped when the belt slip control is cancelled by stepping-on the accelerator and the accelerator is released as soon as the returning control starts.

That is, in the belt slip control, control to actively slip the belt in an allowable slip range is performed, therefore a belt clamp force is in a low state compared with that in the normal control. When returning from the belt slip control to the normal control, if input torque to the belt type continuously variable transmission mechanism 4 is changed in the increasing direction, the input torque exceeds the belt clamp force, and there is a possibility that an excessive belt slip occurs.

On the other hand, in transition from the belt slip control to the normal control, during the period of time t6 to time t7 in FIG. 13, the input torque to the belt type continuously variable transmission mechanism 4 is suppressed not to become excessively large with respect to the belt clamp force, while a belt clamp force at the end of the belt slip control is restored to a level at the normal control, by limiting the changing speed of the input torque that changes in the increasing direction and suppressing the increase of the input torque so as to maintain the actual torque at the end of the belt slip control.

Owing to the torque limit control for limiting the changing speed of the input torque to the belt type continuously variable transmission mechanism 4 in returning from the belt slip control to the normal control, it is possible to prevent the input torque to the belt type continuously variable transmission mechanism 4 from becoming excessively large relative to the belt clamp force and prevent the belt 44 from slipping.

In particular, in the first embodiment, since the torque limit control that maintains the input torque to the belt type continuously variable transmission mechanism 4 at the end of the belt slip control is performed, although it is a simple torque limit control, it is possible to reliably suppress the input torque to the belt type continuously variable transmission mechanism 4 not to become excessively large with respect to the belt clamp force.

[Primary Revolution Increase Rate Limit Operation in Returning Control from BSC to Normal Control]

During the returning control from the belt slip control to the normal control, as described above, if the torque limit control is performed to change the gear ratio at normal changing speed in a state where the changing speed of the input torque to the belt type continuously variable transmission mechanism 4 is suppressed, the decrease of the input torque based on a change of revolution inertia appears prominently, and therefore an unnecessary feeling of deceleration (pull shock) may be experienced by a driver. Accordingly, the changing speed of the gear ratio is limited along with limiting the changing speed of the input torque of the belt type continuously variable transmission mechanism 4.

That is, when the BSC continuation is aborted and entered in the returning control to the normal control, the flow from step S541→step S542→step S543→step S544 to step S545 in the flowchart in FIG. 10 is repeated until changing gear ends. That is, in step S541, a target inertia torque is calculated from the engine torque. In the following step S542, a target primary revolution change rate is calculated from the target inertia torque. And an inertia torque to be reduced is set, and based on this limited target inertia torque, in step S543, the limited target primary revolution speed not exceeding an unlimited target primary revolution change rate (gradient) is calculated. And in step S544, the changing gear control is performed on the basis of the limited target primary revolution speed. Thus, the changing gear control is performed based on the limited target primary revolution speed, so that when comparing a target gear ratio that is finally produced, regarding a characteristic of the target gear ratio, a change gradient of the limited target gear ratio is moderate compared with the unlimited target gear ratio.

The returning control operation by torque delay and a primary revolution increase rate limiter adopted to the first embodiment is explained based on a timing chart illustrated in FIG. 12.

Firstly, an engine torque characteristic is explained. As for the engine torque in a range from the end of the BSC to returning to the normal control, a characteristic in which the driver request torque rises in a stepwise manner is shown. As for the engine torque by an actual torque response in the normal control where the torque limit control is not performed, a characteristic in which the torque rises soon after the BSC ends is shown. On the other hand, as for the engine torque in the first embodiment, as illustrated in the actual torque response after a torque down by the BSC, a characteristic in which the torque is maintained for a while from the end of the BSC, and then the torque rises tardily is shown.

Next, a target gear ratio characteristic and an inertia torque characteristic are explained. As for a target primary revolution speed characteristic in the range from the end of the BSC to returning to the normal control, an attainment target characteristic is given by a step characteristic at the end of the BSC, and as for a target primary revolution speed characteristic in the normal control where the primary revolution increase rate limit control is not performed, a characteristic in which the target primary revolution speed rises at a large gradient soon after the end of the BSC is shown. On the other hand, as for a target primary revolution speed characteristic according to the first embodiment, a characteristic in which the target primary revolution speed rises gradually at a moderate gradient compared with the normal control is shown. The inertia torque characteristic in the normal control falls drastically from the end of the BSC, and an inertia torque characteristic according to the first embodiment falls gently between the end of the BSC and the time of returning to the normal.

Finally, a drive shaft torque characteristic and the inertia torque characteristic are explained. As for the drive shaft torque characteristic when the torque delay and the primary revolution speed increase rate limit control are not performed (normal control), as illustrated by a characteristic E in FIG. 14, a peak of the inertia torque is large, and a response of the engine torque is also quick, therefore a characteristic in which after the beginning of changing gear, the torque falls to some degree compared with that before the beginning of changing gear, and then the torque rises is shown. When such a drive shaft torque characteristic is shown, a shock due to changing gear does not occur.

Figure 14:
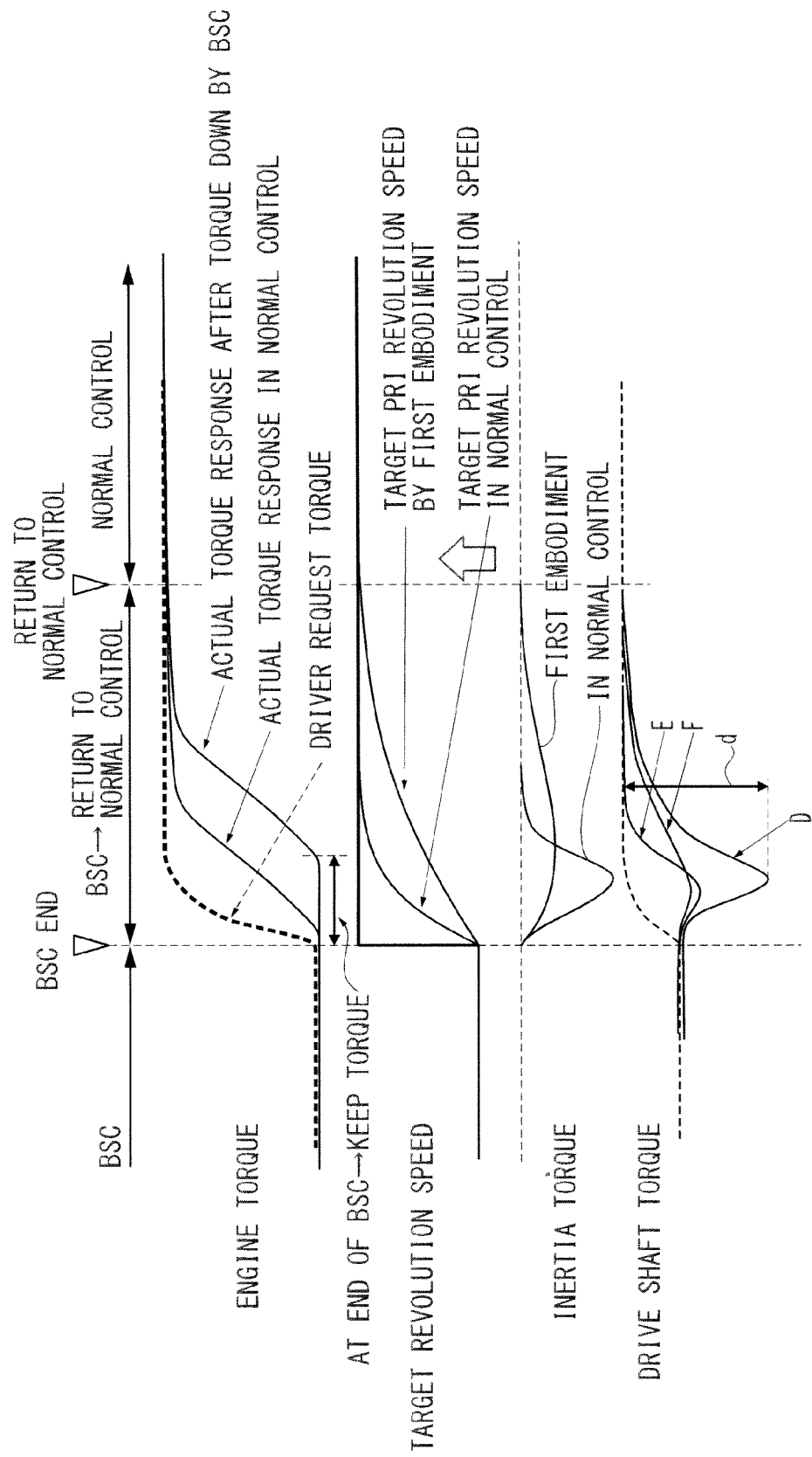
FIG. 14 is a timing chart of the respective characteristics of engine torque by torque delay and primary revolution increase rate, target primary revolution speed, inertia torque, and drive shaft torque applied in the returning control according to the first embodiment.

As for a drive shaft torque characteristic when the torque delay is performed but the primary revolution increase rate limit control is not performed, as illustrated by a characteristic D in FIG. 14, an inertia torque characteristic which is the same as the normal time is maintained and a late input of the engine torque occurs by the torque delay, so that a characteristic having a drop d in which after the beginning of changing gear, the torque falls sharply compared with that before the beginning of changing gear, and then the torque rises is shown. If such a drive shaft torque change occurs, a driver feels a shock and this leads to deterioration of running performance and comfort.

On the other hand, as for a drive shaft torque characteristic according to the first embodiment 1 where the torque delay and the primary revolution increase rate limit control are performed together, as illustrated by a characteristic F in FIG. 14, if an input of the engine torque is late by the torque delay, a peak of the inertia torque can be lowered by the primary revolution increase rate limit control, and therefore a characteristic in which after the beginning of changing gear, the torque falls to some degree compared with that before the beginning of changing gear, and then the torque rises is shown. That is, if the torque delay and the primary revolution increase rate limit control are performed at the same time, it is found that a shock can be suppressed.

As described above, during the returning control from the belt slip control to the normal control, along with performing the torque limit control, control to put a limit to a change rate of the primary revolution is performed, so that a revolution inertia change at the beginning of changing gear is lowered, and falling of the drive shaft torque is suppressed compared with that before the beginning of changing gear. As a result, an unnecessary shock (feeling of deceleration) experienced by a driver can be prevented.

[Setting Operation of Oscillation Amplitude of Secondary Hydraulic Pressure During BSC]

Since the gear ratio range where the belt slip control is permitted is a limited narrow range, oscillation amplitude of the secondary hydraulic pressure during the belt slip control according to the first embodiment is previously set to an optimum value that is capable of achieving an improvement of fuel efficiency in a control permitted gear ratio range, suppression of an occurrence of vehicle vibration by the belt slip control, and ensuring detection performance of the belt slip rate, and is given at a fixed value to the system. Hereinafter, an idea that led to a way of setting a value of the oscillation amplitude of the secondary hydraulic pressure is explained.

Firstly, in a case of controlling the secondary hydraulic pressure in the normal control, hydraulic pressure control is performed in consideration of a safety factor K and a lowest possible pressure. The safety factor K is used as an index with respect to a belt slippage (belt slip) of a belt clamp force applied to the belt 44, and is calculated by a known expression, for example.

$$K = \{(Pout + \beta \cdot V^2)Sout + W\} / \{T \cos \alpha / (D \cdot \mu)\} \quad (1)$$

Here,
Pout: secondary hydraulic pressure
B: centrifugal hydraulic pressure coefficient of secondary hydraulic pressure chamber 46
V: vehicle speed
Sout: received pressure area of secondary hydraulic pressure chamber 46
W: spring load of secondary hydraulic pressure chamber 46
T: transmitted torque
A: sheave angle of primary pulley 42 and secondary pulley 43
D: diameter of primary pulley 42 where belt 44 is wound around
μ: friction coefficient between secondary pulley 43 and belt 44

If the safety factor K is below K=1.0, a slippage occurs between the secondary pulley 43 and the belt 44. On the other hand, as the safety factor K becomes larger than K=1.0, the clamp force applied to the belt 44 becomes excessive, and durability of the belt 44 decreases, and belt friction increases. Therefore, generally, due to tolerance having the belt 44, the friction coefficient μ has variations, however the safety factor K is set to be within a range of K=1.2 to 1.5, for example. The lowest possible pressure is set based on elements of a hydraulic pressure control system included in each vehicle.

Figure 15:
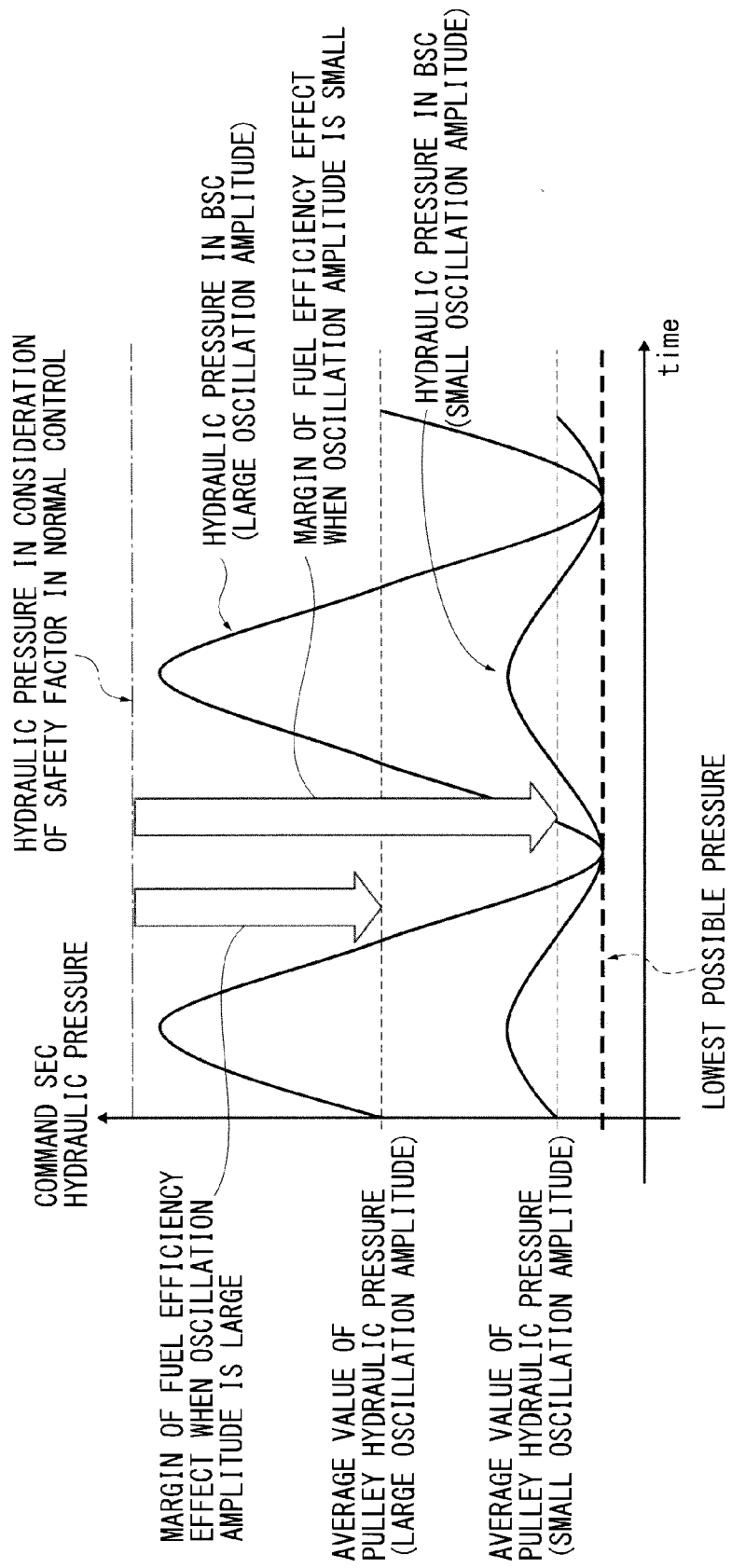
FIG. 15 is a timing chart of contrast characteristics of the secondary hydraulic pressure in the belt slip control when the oscillation amplitude is large and when the oscillation amplitude is small according to the first embodiment.

As illustrated in FIG. 15, under the condition of exceeding the lowest possible pressure, generally, the command secondary hydraulic pressure in the normal control is calculated on the assumption that the safety factor K is 1.3, and is hydraulic pressure that is necessary to make the safety factor K to be 1.3.

As described above, the belt slip control reduces the secondary hydraulic pressure that is hydraulic pressure to obtain a clamp force without the belt slippage to estimate the safety factor K, and decreases the belt friction that is equivalent to a reduced amount of the secondary hydraulic pressure. As a result, fuel efficiency is achieved. Therefore, as illustrated in FIG. 15, if oscillation amplitude superposed on the secondary hydraulic pressure increases, an average value of pulley hydraulic pressure becomes high, and hydraulic pressure can not be sufficiently reduced, and a margin of a fuel efficiency effect reduces. And there is a possibility that vehicle vibration occurs due to the belt slip control. However, if the oscillation amplitude superposed on the secondary hydraulic pressure reduces, the average value of pulley hydraulic pressure becomes low, and hydraulic pressure can be sufficiently reduced, and the margin of the fuel efficiency effect increases. That is, characteristics illustrated in FIG. 15 express that as the oscillation amplitude superposed on the secondary hydraulic pressure is set to a smallest possible value, the margin of the fuel efficiency effect due to the belt slip control becomes large.

Next, a case where the oscillation amplitude is given at a constant value without consideration of the gear ratio is explained.

As in the first embodiment, a belt slip control is performed based on a belt slip state presumed by oscillating the secondary hydraulic pressure, and monitoring a phase difference between the oscillation components included in actual secondary hydraulic pressure and the actual gear ratio. In this case, when the oscillation amplitude is a small value, the oscillation component is included in the actual secondary hydraulic pressure, however in a case where a belt contact diameter of a pulley is not reached to be changed, it is a state where the oscillation component can not be extracted from the actual gear ratio calculated by the calculation of the revolution speed ratio. And if the detection performance of the belt slip state is not ensured, the belt slip control itself is not established, and accordingly it is necessary to set the oscillation amplitude to be a value large enough to extract the oscillation component from the actual gear ratio. Therefore, if the oscillation amplitude is set to the value large enough to extract the oscillation component from the actual gear ratio in the entire gear ratio range, a margin of a decrease of the secondary hydraulic pressure is limited (see FIG. 15), and an improvement of sufficient fuel efficiency that the belt slip control is aiming for is not expected.

On the other hand, in the first embodiment, in a case of oscillating the secondary hydraulic pressure in the belt slip control, the oscillation amplitude of the secondary hydraulic pressure is set to a small value, as the gear ratio is on the side of the high gear ratio. Therefore, by a variable setting of the oscillation amplitude corresponding to the gear ratio where the belt slip control is performed, it is possible to achieve the improvement of the effect of the fuel efficiency, suppress of the occurrence of vehicle vibration by the belt slip control, and ensure the detection performance of the belt slip rate. Hereinafter, the reason will be explained.

Firstly, the invertors and so on of the present invention focused on the high-low change of the gear ratio. In this case, with respect to the same oscillation amplitude of the secondary hydraulic pressure, as the gear ratio is on the side of the high gear ratio, the sensitivity of the primary thrust is high, in other words, it has been discovered that sensitivity of gear ratio variation is high and oscillation of the gear ratio tends to occur.

Figure 16:
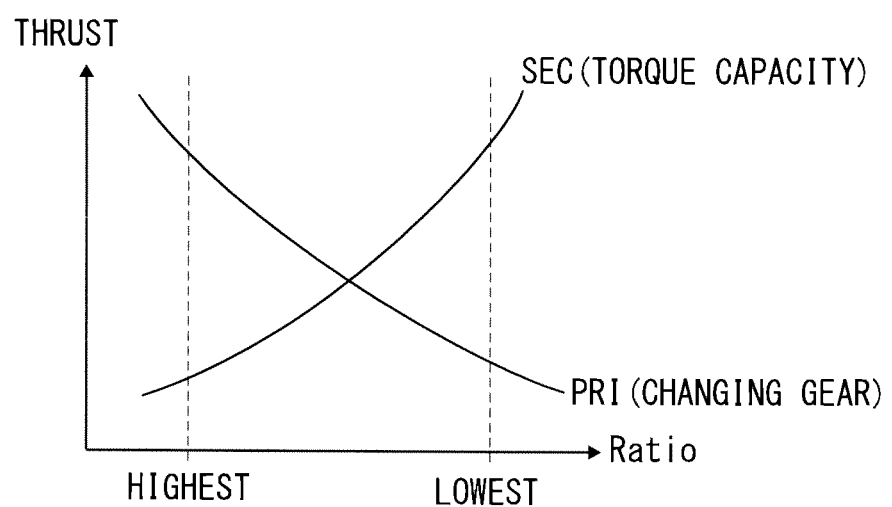
FIG. 16 is a characteristic diagram of a change of the primary thrust with respect to the gear ratio of the primary pulley that manages changing gear and a change of the secondary thrust with respect to the gear ratio of the primary pulley that manages the torque capacity in the belt type continuously variable transmission according to the first embodiment.

That is, FIG. 16 is a characteristic diagram illustrating a change of the primary thrust with respect to the gear ratio and a change of the secondary thrust with respect to the gear ratio. Regarding a characteristic of the primary thrust with respect to the gear ratio, the primary pulley 42 manages changing gear, therefore the primary thrust is small on a side of a low gear ratio where a belt contact diameter is small, and the primary thrust becomes large on a side of a high gear ratio where the belt contact diameter is large. On the other hand, regarding a characteristic of the secondary thrust with respect to the gear ratio, the secondary pulley 43 manages the torque capacity, therefore the secondary thrust is large on the side of the low gear ratio where the belt contact diameter is large, and the primary thrust is small on the side of the high gear ratio where the belt contact diameter is small.

Figure 17:
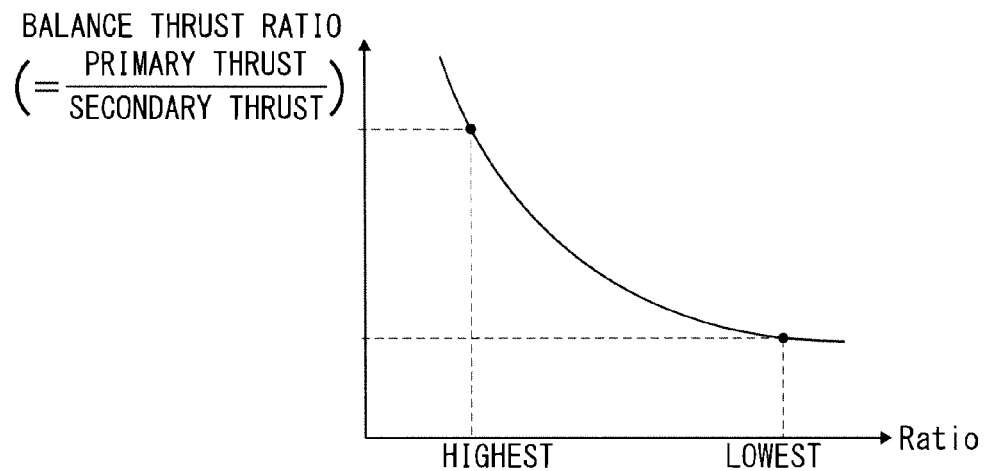
FIG. 17 is a characteristic diagram of a change of balance thrust ratio (=primary thrust/secondary thrust) with respect to the gear ratio in the belt type continuously variable transmission according to the first embodiment.

Accordingly, if the characteristics in FIG. 16 are illustrated by balance thrust ratio (=primary thrust/secondary thrust) that is a ratio of the primary thrust to the secondary thrust, as illustrated in FIG. 17, a characteristic that when the gear ratio is at the highest, the balance thrust ratio becomes the highest, and as the gear ratio changes on the side of the low gear ratio, the balance thrust ratio lowers, and when the gear ratio is at the lowest, the balance thrust ratio becomes the lowest is shown. Thus, when the gear ratio is at the highest, the balance thrust ratio becomes the highest, which means with respect to the same oscillation amplitude to the secondary hydraulic pressure, as the gear ratio is on the side of the high gear ratio, the change of the primary thrust is large, and the sensitivity of the gear ratio variation is high, that is, the oscillation of the gear ratio tends to occur.

This means that, in a case where the gear ratio is on the side of the high gear ratio, if the oscillation amplitude of the secondary hydraulic pressure is set to a small value, it is possible to ensure the detection performance of the belt slip state by extracting the oscillation component from the actual gear ratio. And in a case where the gear ratio is on the high gear ratio, by setting the oscillation amplitude of the secondary hydraulic pressure to a small value, it is possible to achieve practical fuel efficiency, in a case of being applied in an engine vehicle as in the first embodiment. And by the variable setting of the oscillation amplitude corresponding to the gear ratio, as illustrated by a lower limit oscillation amplitude value characteristic L in FIG. 19, as the gear ratio becomes on the side of the low gear ratio, the oscillation amplitude of the secondary hydraulic pressure is set to a large value, however by aiming for a marginal field of the detection performance of the belt slip state with respect to the gear ratio in the belt slip control, it is possible to achieve the effect of energy saving of the maximum range.

Next, based on FIG. 19, a method for determining the oscillation amplitude in the belt slip control will be explained.

In the first embodiment, the oscillation amplitude is determined on the basis of the gear ratio, the lowest possible pressure, and the vehicle vibration.

Figure 18:
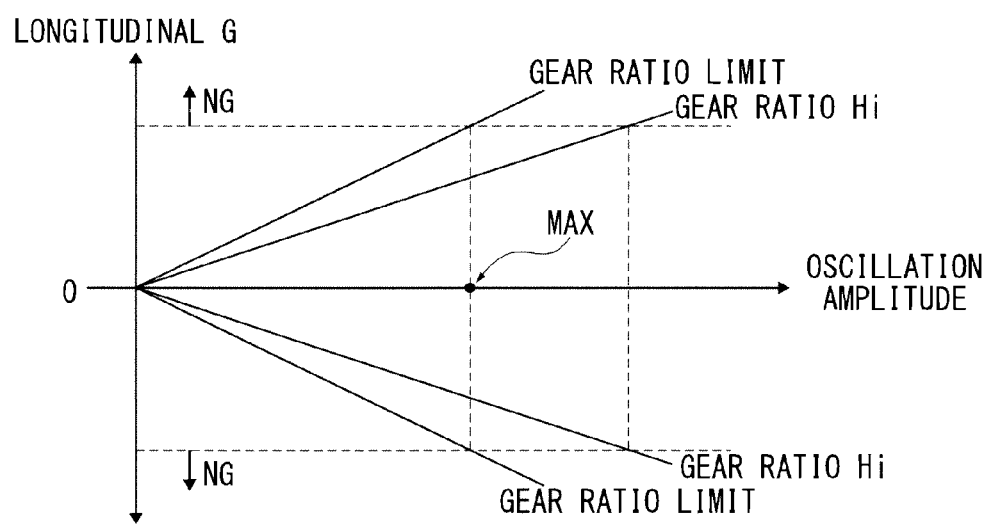
FIG. 18 is a characteristic diagram of a change of longitudinal G when the gear ratio is different with respect to the oscillation amplitude in the belt type continuously variable transmission according to the first embodiment.

Firstly, when the oscillation amplitude is set to a value large enough to extract the oscillation component from the actual gear ratio in the entire gear ratio range from the lowest to the highest, the oscillation of the gear ratio appears. With respect to the oscillation of the gear ratio, the transmission input revolution changes and vehicle oscillation occurs due to longitudinal acceleration (=longitudinal G), and passenger comfort deteriorates. Therefore, as illustrated in FIG. 18, a limit value of the oscillation amplitude that does not have an influence of the vehicle vibration occurring by the oscillation of the gear ratio based on the oscillation of the secondary hydraulic pressure on a passenger is needed to be a NG (no-good) threshold value of the longitudinal G. At the same time, for setting the oscillation amplitude, exceeding the lowest possible pressure is conditional, as illustrated on the left of FIG. 19, therefore it is not possible to set a value to be a large oscillation amplitude so as to enter a range that is a lower pressure range than the lowest possible pressure. Therefore, a smaller value of values of the oscillation amplitude determined by the vehicle vibration and the value of the oscillation amplitude determined by the lowest possible pressure is taken as an upper limit oscillation amplitude value MAX, as illustrated in FIG. 19, and the oscillation amplitude of the secondary hydraulic pressure is limited to a value that is less than or equal to the upper limit oscillation amplitude value MAX. In the first embodiment, as illustrated in FIG. 19, since the value of the oscillation amplitude determined by the lowest possible pressure is small, the gear ratio to which the belt slip control is applied by the upper limit oscillation amplitude value MAX does not include the lowest range, and has a gear ratio limit. Therefore, the upper limit oscillation amplitude value MAX that is a maximum value of the oscillation amplitude is set to a value that satisfies a condition of the lowest possible pressure and can maintain passenger comfort. And as illustrated in FIG. 19, a lower limit oscillation amplitude value MIN that is a minimum value of the oscillation amplitude is set to a value small enough to extract the oscillation component from the actual gear ratio when the gear ratio is at the highest.

Figure 19:
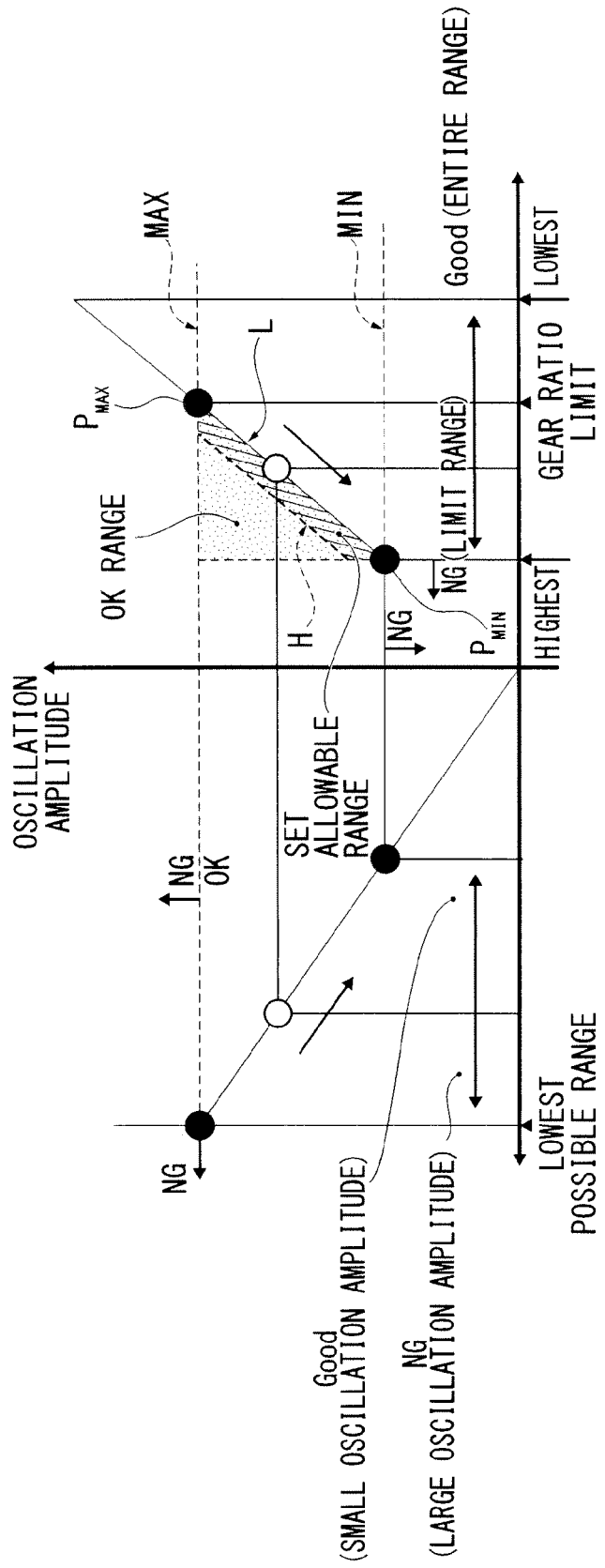
FIG. 19 is an oscillation amplitude characteristic diagram showing a way of determining the oscillation amplitude by the gear ratio, lowest possible pressure, and vehicle vibration in the belt slip control according to the first embodiment.

As illustrated by a dotted range in FIG. 19, a line connecting an intersection point $P_{MAX}$ of the upper limit oscillation amplitude value MAX and the gear ratio limit and an intersection point $P_{MIN}$ of the lower limit oscillation amplitude value MIN and the highest gear ratio, that is, a set of a limit value of the oscillation amplitude where the oscillation component based on the oscillation of the secondary hydraulic pressure is included in the actual gear ratio and a limit value of the oscillation amplitude that becomes small as the gear ratio is on the side of the high gear ratio, is taken as a lower limit oscillation amplitude value characteristic L. Therefore, a range surrounded by the lower limit oscillation amplitude value characteristic L, a line by the upper limit oscillation amplitude value MAX, and a line by the highest gear ratio is taken as an OK range of the oscillation amplitude of the secondary hydraulic pressure.

However, in the OK range of the oscillation amplitude of the secondary hydraulic pressure, in particular, on the side of the high gear ratio, a part in which the oscillation amplitude becomes larger than necessary is included. Therefore, a characteristic in which an oscillation amplitude allowance margin is added to the lower limit oscillation amplitude value characteristic L is taken as an upper limit oscillation amplitude value characteristic H, and an allowable range of the oscillation amplitude of the secondary hydraulic pressure is set to a range surrounded by the lower limit oscillation amplitude value characteristic L, the upper limit oscillation amplitude value characteristic H, the line by the highest gear ratio, and the upper limit oscillation amplitude value MAX, as illustrated by a dotted+hatching range in FIG. 19.

Therefore, in a case of setting the oscillation amplitude in the belt slip control, a value based on the gear ratio in which the belt slip control is applied with values within a range of the allowable range of the oscillation amplitude of the secondary hydraulic pressure illustrated in FIG. 19 is set. Accordingly, in the gear ratio range between the gear ratio limit and the highest gear ratio, it is possible to set an appropriate value that achieves the effect of the fuel efficiency, suppresses the occurrence of the vehicle vibration by the belt slip control, and ensures the detection performance of the belt slip state.

Next, effects will be explained.

According to the control device and the control method of the belt type continuously variable transmission mechanism 4, it is possible to obtain the following effects.

(1) The control device for the belt type continuously variable transmission mechanism 4, including the primary pulley 42 for receiving an input from a drive source (engine 1), the secondary pulley 43 for providing an output to the drive wheels 6, 6, and the belt 44 wound around the primary pulley 42 and the secondary pulley 43, to control a gear ratio determined by a ratio of the diameter of the pulleys where the belt is wound around by controlling a primary hydraulic pressure to the primary pulley 42 and a secondary hydraulic pressure to the secondary pulley 43, the control device further comprises a belt slip control means (FIG. 8) configured to oscillate the secondary hydraulic pressure and monitor a phase difference θ between an oscillation component included in an actual secondary hydraulic pressure and an oscillation component included in an actual gear ratio to estimate a belt slip state, and control the actual secondary hydraulic pressure to decrease on the basis of the estimation to ensure a predetermined belt slip state, and an oscillation amplitude setting means (sine wave oscillator 93a) that sets oscillation amplitude of the oscillation amplitude small when the gear ratio is the high gear ratio compared with when the gear ratio is the low gear ratio, in a case of oscillating the secondary hydraulic pressure in the belt slip control.

Therefore, it is possible to provide the control device of the belt type continuously variable transmission mechanism 4 that achieves the improvement of the effect of energy saving (effect of practical fuel efficiency), suppresses the occurrence of the vehicle vibration by the belt slip control, and ensures the detection performance of the belt slip state by setting the oscillation amplitude corresponding to the gear ratio where the belt slip control is performed.

(2) The oscillation amplitude setting means (sine wave oscillator 93a) sets the oscillation amplitude of the secondary hydraulic pressure small as the gear ratio goes toward the high gear ratio from the low gear ratio in a case of oscillating the secondary hydraulic pressure in the belt slip control.

Therefore, it is possible to precisely correspond to a change of the gear ratio where the belt slip control is performed and set to an appropriate oscillation amplitude.

(3) The oscillation amplitude setting means (sine wave oscillator 93a) sets the oscillation amplitude of the secondary hydraulic pressure to a value that is more than or equal to a lower limit oscillation amplitude value characteristic L, when a set of a limit value of the oscillation amplitude where the oscillation component based on the oscillation of the secondary hydraulic pressure is included in the actual gear ratio and a limit value of the oscillation amplitude that becomes small as the gear ratio is on the side of the high gear ratio is taken as the lower limit oscillation amplitude value characteristic L.

Therefore, during the belt slip control, it is possible to reliably ensure the detection performance of the belt slip state and achieve the improvement of the effect of energy saving (effect of practical fuel efficiency).

(4) The oscillation amplitude setting means (sine wave oscillator 93a) sets the oscillation amplitude of the secondary hydraulic pressure to a value that is less than or equal to the upper limit oscillation amplitude value MAX, when a limit value of the oscillation amplitude that does not have the influence of the vehicle vibration occurring by oscillation of the gear ratio based on the oscillation of the secondary hydraulic pressure on a passenger is taken as the upper limit oscillation amplitude value MAX.

Therefore, during the belt slip control, it is possible to prevent the vehicle vibration that causes an uncomfortable feeling, and ensure passenger comfort.

(5) The oscillation amplitude setting means (sine wave oscillator 93a) takes a characteristic in which an oscillation amplitude allowance margin is added to the lower limit oscillation amplitude value characteristic L as an upper limit oscillation amplitude value characteristic H, and sets the oscillation amplitude of the secondary hydraulic pressure to a value corresponding to the gear ratio of a value within a range of the range surrounded by the lower limit oscillation amplitude value characteristic L, the upper limit oscillation amplitude value characteristic H, the line by the highest gear ratio, and the line by the upper oscillation amplitude value MAX.

Therefore, it is possible to achieve the improvement of the effect of energy saving (effect of practical fuel efficiency), ensure the detection performance of the belt slip state, and prevent of the vehicle vibration for maintaining passenger comfort by setting of the oscillation amplitude corresponding to the gear ratio where the belt slip control is performed.

A control method for a belt type continuously variable transmission mechanism 4 by a belt slip control in which a belt slip state among the primary pulley 42, secondary pulley 43, and belt 44 is controlled with a hydraulic pressure, the method comprising the steps of oscillating the hydraulic pressure to control the hydraulic pressure on the basis of a multiplication value of an oscillation component included in an actual hydraulic pressure and an oscillation component of an actual gear ratio, and setting the oscillation amplitude of the hydraulic pressure small when the gear ratio is the high gear ratio compared with when the gear ratio is the low gear ratio, in a case of oscillating the hydraulic pressure.

Therefore, it is possible to provide the control method of the belt type continuously variable transmission mechanism 4 that achieves the improvement of the effect of energy saving (effect of practical fuel efficiency), suppresses the occurrence of vehicle vibration by the belt slip control, and ensures the detection performance of the belt slip state by setting the oscillation amplitude corresponding to the gear ratio where the belt slip control is performed.

In the belt slip control, the belt slip state is estimated by monitoring a phase difference calculated from the multiplication value, to control the hydraulic pressure on the basis of the estimation to maintain a predetermined belt slip state.

Thus, it is possible to stably maintain a predetermined belt slip state during the belt slip control by accurately knowing a change in the belt slip state by monitoring the phase difference correlated with the belt slip state. As a result, under the belt slip control by which the belt friction is stably reduced, it is possible to realize a targeted effect of energy saving (effect of practical fuel efficiency).

Second Embodiment

A second embodiment is an example of making an oscillation amplitude map corresponding to the gear ratio, and setting the oscillation amplitude by following a change of the gear ratio during the belt slip control.

Firstly, a structure will be explained.

Figure 20:
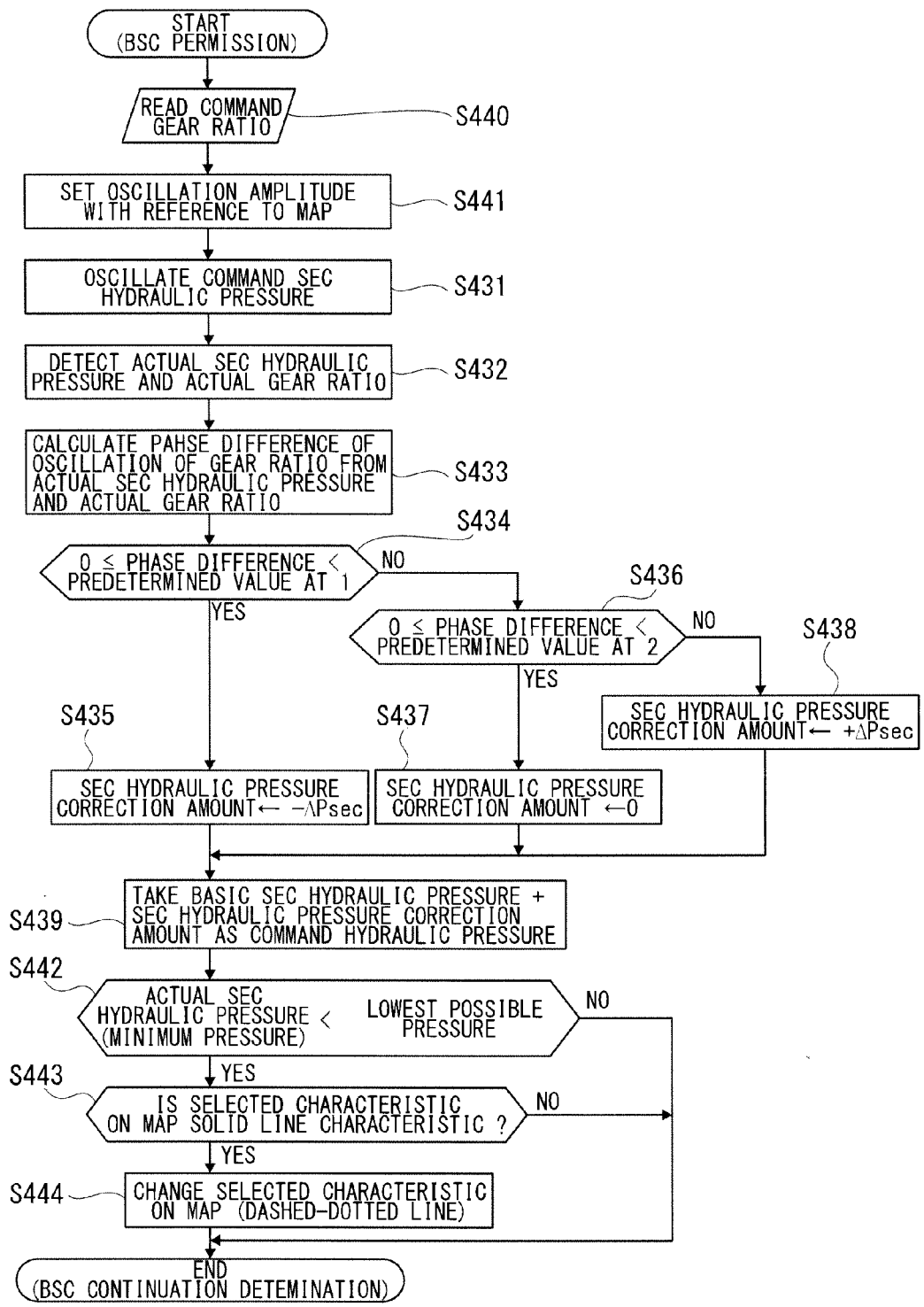
FIG. 20 is a flowchart of a secondary hydraulic pressure oscillation and correction process of the belt sip control process performed in the CVT control unit 8 according to the second embodiment.
Figure 21:
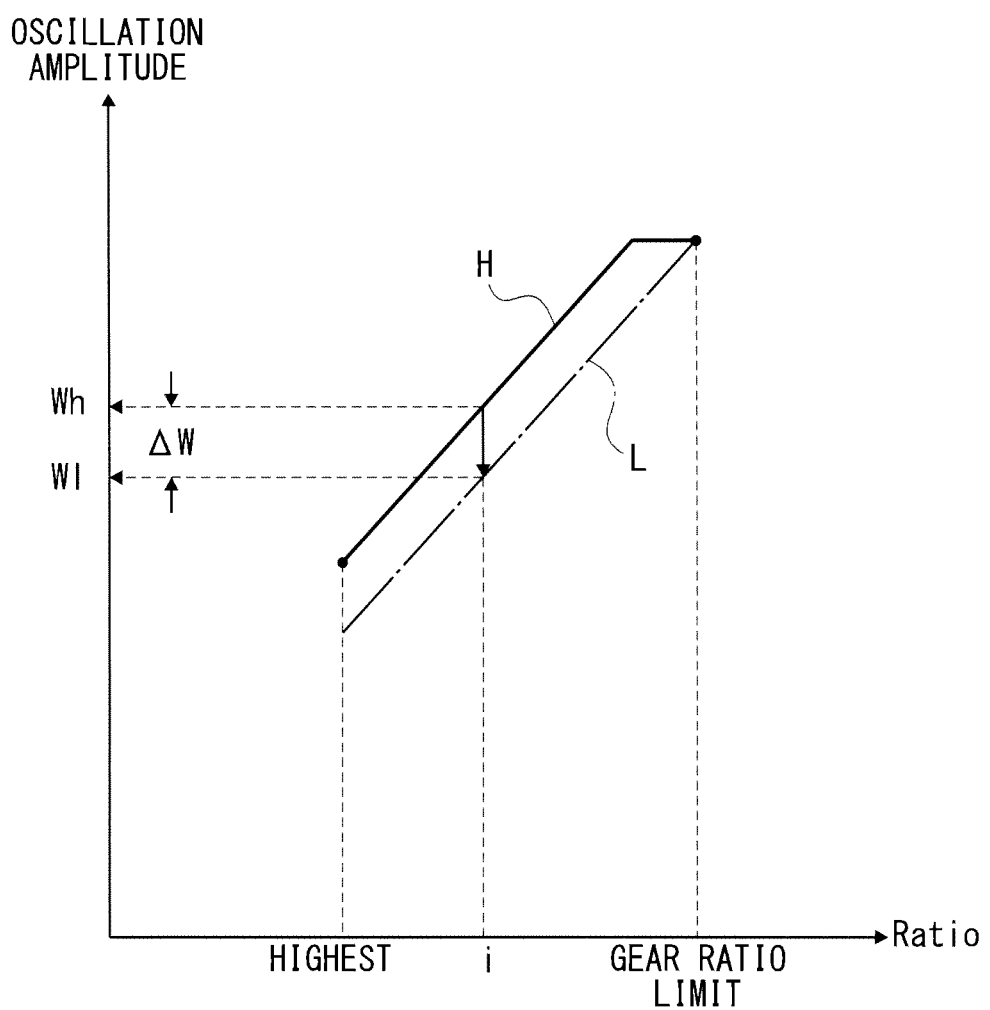
FIG. 21 is a diagram of an example of an oscillation amplitude map referred to in a case of setting the oscillation amplitude in a secondary hydraulic pressure oscillation process in the second embodiment.

FIG. 20 is a flowchart for an oscillation and correction process of the secondary hydraulic pressure of a belt slip control process executed by the CVT control unit 8 according to the second embodiment. FIG. 21 is a diagram illustrating an example of the oscillation amplitude map referred to in a case where the oscillation amplitude is set in an oscillation process of the secondary hydraulic pressure in the second embodiment. Hereinafter, each step of FIG. 20 will be explained. Each step of step S431 to step S439 corresponds to each step of step S331 to step S339 of FIG. 8, therefore the explanation is omitted.

In step S440, calculation is performed in a changing gear controller, and a command gear ratio used for the changing gear control is read, and the flow proceeds to step S441.

In step S441, following the reading of the command gear ratio in step 440, on the basis of gear ratio information and the oscillation amplitude map (see FIG. 21), the oscillation amplitude is set by following the change of the gear ratio, and then the flow proceeds to step S431.

Here, in the oscillation amplitude map, as illustrated in FIG. 21, two characteristics which are a solid line characteristic (corresponding to upper limit oscillation amplitude value characteristic H illustrated in FIG. 19) having a relationship in which the oscillation amplitude is small as the gear ratio is on the side of high gear ratio, and a dashed-dotted line characteristic (corresponding to lower limit oscillation amplitude value characteristic L illustrated in FIG. 19) having a relationship in which the oscillation amplitude is small as the gear ratio is on the side of high gear ratio are set. And at the beginning of the belt slip control, the solid line characteristic is selected.

In step S442, following the calculation of the command secondary hydraulic pressure in step S439, by reduction correction of the secondary hydraulic pressure by the belt slip control, a determination is made as to whether or not a minimum pressure of the oscillated secondary hydraulic pressure becomes less than the lowest possible pressure, and in a case of YES (actual secondary hydraulic pressure<lowest possible pressure), the flow proceeds to step S443, and in a case of NO (actual secondary hydraulic pressure≥lowest possible pressure), the flow proceeds to END.

In step S443, following the determination that actual secondary hydraulic pressure<lowest possible pressure in step S442, a determination is made as to whether or not the characteristic that is selected in the oscillation amplitude map at the moment is the solid line characteristic, and in a case of YES (solid line characteristic), the flow proceeds to step S444, and in a case of NO (dashed-dotted line characteristic), the flow proceeds to END.

In step S444, following the determination of selecting the solid line characteristic in step S443, the characteristic selected in the oscillation amplitude map is changed to the dashed-dotted line characteristic from the solid line characteristic, and the flow proceeds to END.

Since other structures except FIG. 8 of FIGS. 1 to 10 are the same as in the first embodiment, illustrations and explanations are omitted.

Next, functions will be explained.

In the second embodiment, the oscillation amplitude map (FIG. 21) in accordance with the gear ratio is made, and during the belt slip control, the oscillation amplitude is set with reference to the oscillation amplitude map. Hereinafter, based on FIGS. 20 and 21, a setting function of the oscillation amplitude during the belt slip control will be explained.

[Setting Function of Added Oscillation Amplitude During Belt Slip Control]

At the beginning of the belt slip control, and when the condition where the phase difference θ is less than a predetermined value at 1 is satisfied, in the flowchart in FIG. 6, the flow from step S440→step S441→step S431→step S432→step S433→step S434→step S435→step S439→step S442→END is repeated. That is, the added oscillation amplitude is set by the command gear ratio at the beginning of the belt slip control, or the command gear ratio that changes after the gear and the solid line characteristic of the oscillation amplitude map in FIG. 21, and every time the flow is repeated, the secondary hydraulic pressure lowers in response to the correction by −ΔPsec.

By repeating the reduction correction of the command secondary hydraulic pressure, when the actual secondary hydraulic pressure becomes less than the lowest possible pressure, from step S439 in FIG. 20, the flow proceeds to step S442→step S443→step S444→END, and a characteristic for setting the oscillation amplitude is changed to the dashed-dotted line characteristic from the previous solid line characteristic, and from the beginning of a next control operation until the end of the belt slip control, the oscillation amplitude is set by the command gear ratio at the time and the dashed-dotted line characteristic of the oscillation amplitude map in FIG. 21.

When the phase difference θ becomes equal to or more than the predetermined value at 1, until the phase difference θ becomes a predetermined value at 2, in the flowchart in FIG. 20, the flow proceeds from step S440→step S441→step S431→step S432→step S433→step S434→step S436→step S437→step S439→step S442 to END, and the command secondary hydraulic pressure is maintained. And when the phase difference θ becomes equal to or more than the predetermined value at 2, in the flowchart in FIG. 20, the flow proceeds from step S440→step S441→step S431→step S432→step S433→step S434→step S436→step S438→step S439→step S442 to END, and the secondary hydraulic pressure rises in response to the correction by +ΔPsec. That is, in the belt slip control, the slip rate is maintained so that the phase difference θ is within the range of the predetermined values from 1 or more to less than 2.

The oscillation amplitude in the belt slip control is set by following the change of the command gear ratio, if any one of the two characteristics in the oscillation amplitude map is selected.

Therefore, when a range of the gear ratio where the belt slip control is permitted is large, by setting the oscillation amplitude by following the change of the command gear ratio in the permitted range, a value of the oscillation amplitude becomes an appropriate value corresponding to the command gear ratio, and it is possible to expect a further improvement of the effect of the fuel efficiency, compared with the first embodiment where the oscillation amplitude is given at the predetermined constant value.

In the setting of the oscillation amplitude in the belt slip control, the solid line characteristic (upper limit oscillation amplitude value characteristic H illustrated in FIG. 19) in the oscillation amplitude map is selected, until the actual secondary hydraulic pressure falls below the lowest possible pressure from the beginning of the control. And when the actual secondary hydraulic pressure falls below the lowest possible pressure, the dashed-dotted line characteristic (lower limit oscillation amplitude value characteristic L illustrated in FIG. 19) is selected. That is, at the same gear ratio i, as illustrated in FIG. 21, when the upper limit oscillation amplitude value characteristic H is selected, the oscillation amplitude becomes an oscillation amplitude Wh, and when the lower limit oscillation amplitude value characteristic L is selected, the oscillation amplitude becomes an oscillation amplitude Wl, which is smaller than the oscillation amplitude Wh by only an oscillation amplitude difference ΔW.

Therefore, until the actual secondary hydraulic pressure falls below the lowest possible pressure from the beginning of the control, with respect to the minimum oscillation amplitude that extracts the oscillation component from the actual gear ratio, the setting of the oscillation amplitude by a slightly large value is established, and it is possible to reliably meet the request for the detection performance of the belt slip state in a range of the beginning of the control. And when the actual secondary hydraulic pressure falls below the lowest possible pressure, the setting of the oscillation amplitude by a minimum level that extracts the oscillation component from the actual gear ratio is established, and in particular, it is possible to meet the request for the improvement of the fuel efficiency in a case where the belt slip control continues for a long time.

Other functions are the same as in the first embodiment, therefore the explanation is omitted.

Next, effects will be explained.

In the control device of the belt type continuously variable transmission mechanism 4 according to the second embodiment, in addition to the effects (1) to (7) of the first embodiment, it is possible to obtain the following effects.

(8) the oscillation amplitude setting means (FIG. 20) sets the oscillation amplitude map (FIG. 21) having the relationship in which the oscillation amplitude is small as the gear ratio is on the side of high gear ratio, and the belt slip control means (FIG. 20) sets the oscillation amplitude by following the change of the gear ratio based on the gear ratio information and the oscillation amplitude map, during the belt slip control.

Therefore, a value of the oscillation amplitude becomes an appropriate value corresponding to the command gear ratio, and it is possible to improve the effect of energy saving (fuel efficiency) compared with the first embodiment.

(9) The oscillation amplitude setting means (FIG. 20) sets the oscillation amplitude map (FIG. 21) to the upper limit oscillation amplitude value characteristic H in which the amplitude allowance margin is added to the lower limit oscillation amplitude value characteristic L, and the belt slip control means (FIG. 20), by performing the control to reduce the actual secondary hydraulic pressure during the belt slip control, when the actual secondary hydraulic pressure that oscillates by a set oscillation amplitude falls below the lowest possible pressure in the hydraulic pressure control system, changes the set oscillation amplitude to a small value as a limit that is a lower limit amplitude value in the gear ratio at the time.

Therefore, during the belt slip control, it is possible to reliably meet the request for the detection performance of the belt slip control state in the range of the beginning of the control, and meet the request for the improvement of the effect of the energy saving (request for improvement of fuel efficiency) in the control continuation range.

Although the control device and method for the belt type continuously variable transmission according to the present invention have been described in terms of the exemplary first embodiment and second embodiment, they are not limited thereto. It should be appreciated that design variations or additions may be made without departing from the scope of the present invention as defined by the following claims.

The first and second embodiments have described an example where the oscillation amplitude is set gradually small, as the gear ratio goes toward the high gear ratio. However, between the low gear ratio and the high gear ratio to which the belt slip control is applied, the oscillation amplitude can be also set small in a stepwise manner.

The first embodiment has described an example where a hydraulic pressure circuit of a single pressure-adjusting type controlled by a step motor is used for the transmission hydraulic pressure control unit 7. However, another single pressure-adjusting type or a dual pressure-adjusting type transmission hydraulic pressure control unit can be also used.

The first embodiment has described an example where only the secondary hydraulic pressure is oscillated. However, for example, the primary hydraulic pressure together with the secondary hydraulic pressure can be concurrently oscillated in the same phase by a direct acting control system. Alternatively, the primary hydraulic pressure together with the secondary hydraulic pressure can be oscillated in the same phase by oscillating the line pressure.

The first embodiment has described an example of an oscillation means where the command secondary hydraulic pressure is given proper oscillation components. Alternatively, solenoid current values can be given proper oscillation components.

The first embodiment has described an example where the input torque at the end of the belt slip control is maintained for only a predetermined time as the torque limit control in the returning control. However, for example, as the torque limit control, a minimal torque rise can be permitted.

The first embodiment has described an example of putting a limit to the change rate of the target primary revolution speed, as the limit control of the changing speed of the speed-change ratio in the returning control. However, as the limit control of the changing speed of the gear ratio, a limit can be put to a changing gear time constant, the gear ratio at the end of the belt slip control can be maintained for only the predetermined time, and those methods can be combined.

The second embodiment has described an example of changing a set oscillation amplitude to a small value as a limit that is the lower limit amplitude value in the gear ratio at the time, when the actual secondary hydraulic pressure oscillated by the set oscillation amplitude falls below the lowest possible pressure in the hydraulic pressure control system, by performing the control to reduce the actual secondary hydraulic pressure during the belt slip control, as the belt slip control means. However, instead of the lowest possible pressure in the hydraulic pressure, and using the transmitted torque capacity by the belt, the set oscillation amplitude can be changed to a small value as a limit that is a lower limit oscillation amplitude value in the gear ratio at the time, when the transmitted torque capacity falls below lowest possible transmitted torque capacity. The second embodiment has described an example of changing in two steps, in a case of changing to a small value. However, changing can be performed in a large number of steps equal to or more than three steps, or steplessly performed.

The first embodiment has described an application example of an engine vehicle incorporating a belt type continuously variable transmission. The present invention is also applicable to a hybrid vehicle incorporating a belt type continuously variable transmission, an electric vehicle incorporating a belt type continuously variable transmission and the like. In short it is applicable to any vehicle incorporating a belt type continuously variable transmission which performs a hydraulic pressure transmission control.

REFERENCE SIGNS LIST 1 engine
2 torque converter
3 forward/backward drive switch mechanism
4 belt type continuously variable transmission mechanism
40 transmission input shaft
41 transmission output shaft 42 primary pulley
43 secondary pulley
44 belt
45 primary hydraulic pressure chamber
46 secondary hydraulic pressure chamber
5 final reduction mechanism
6, 6 drive wheel
7 transmission hydraulic pressure control unit
70 oil pump
71 regulator valve
72 line pressure solenoid
73 transmission control valve
74 decompression valve
75 secondary hydraulic pressure solenoid
76 servo link
77 transmission command valve
78 step motor
8 CVT control unit
80 primary revolution sensor
81 secondary revolution sensor
82 secondary hydraulic pressure sensor
83 oil temperature sensor
84 inhibitor switch
85 brake switch
86 accelerator opening sensor
87 other sensors and switches
88 engine control unit
90 basic hydraulic pressure calculator
91 line pressure controller
92 secondary hydraulic pressure controller
93 sine wave oscillation controller (oscillation setting means)
94 secondary hydraulic pressure corrector

The invention claimed is:

1. A control device for a belt type continuously variable transmission, comprising a primary pulley for receiving an input from a drive source, a secondary pulley for providing an output to a drive wheel, and a belt wound around the primary pulley and the secondary pulley, to control a gear ratio determined by a ratio of a diameter of the pulleys where the belt is wound around by controlling a primary hydraulic pressure to the primary pulley and a secondary hydraulic pressure to the secondary pulley, the device further comprising:
a belt slip controller configured to oscillate the secondary hydraulic pressure and monitor a phase difference between an oscillation component included in an actual secondary hydraulic pressure and an oscillation component included in an actual gear ratio to estimate a belt slip state, and control the actual secondary hydraulic pressure to decrease on the basis of the estimation to maintain a predetermined belt slip state; and
an oscillation amplitude setter configured to set an oscillation amplitude of the secondary hydraulic pressure small when the gear ratio is a high gear ratio compared with when the gear ratio is a low gear ratio, in a case of oscillating the secondary hydraulic pressure in the belt slip control.

2. The control device for a belt type continuously variable transmission according to claim 1, wherein
the oscillation amplitude setter is configured to set the oscillation amplitude of the secondary hydraulic pressure small as the gear ratio goes toward the high gear ratio from the low gear ratio, in a case of oscillating the secondary hydraulic pressure in the belt slip control.

3. The control device for a belt type continuously variable transmission according to claim 1, wherein
the oscillation amplitude setter is configured to set the oscillation amplitude of the secondary hydraulic pressure to a value equal to or more than a lower limit oscillation amplitude value characteristic, when an oscillation component based on an oscillation of the secondary hydraulic pressure is a limit value of an oscillation amplitude included in the actual gear ratio, and a set of limit values of the oscillation amplitude that become small as the gear ratio is on a side of the high gear ratio is taken as the lower limit oscillation amplitude value characteristic.

4. The control device for a belt type continuously variable transmission according to claim 1, wherein
the oscillation amplitude setter is configured to set the oscillation amplitude of the secondary hydraulic pressure to a value less than or equal to an upper limit oscillation amplitude value, when a limit value of an oscillation amplitude that does not have an influence of a vehicle vibration occurring by an oscillation of the gear ratio based on the oscillation of the secondary hydraulic pressure on a passenger is taken as the upper limit oscillation amplitude value.

5. The control device for a belt type continuously variable transmission according to claim 1, wherein
when an oscillation component based on an oscillation of the secondary hydraulic pressure is a limit value of the oscillation amplitude included in the actual gear ratio, and a set of limit values of the oscillation amplitude that become small as the gear ratio is on a side of the high gear ratio is taken as a lower limit oscillation amplitude value characteristic, and a characteristic where an oscillation amplitude allowance margin is added to the lower limit oscillation amplitude value characteristic is taken as an upper limit oscillation amplitude value characteristic, and a limit value of an oscillation amplitude that does not have an influence of a vehicle vibration occurring by an oscillation of the gear ratio based on the oscillation of the secondary hydraulic pressure on a passenger is taken as an upper limit oscillation amplitude value, the oscillation amplitude setter is configured to set the oscillation amplitude of the secondary hydraulic pressure to a value corresponding to the gear ratio of a value within a range of a range surrounded by the lower limit oscillation amplitude value characteristic, the upper limit oscillation amplitude value characteristic, a line by a highest gear ratio, and a line by the upper limit oscillation amplitude.

6. The control device for a belt type continuously variable transmission according to claim 1, wherein
the oscillation amplitude setter is configured to set an oscillation amplitude map having a relationship in which the oscillation amplitude is small as the gear ratio is on the side of the high gear ratio, and the belt slip controller is configured to set the oscillation amplitude by following a change of the gear ratio based on gear ratio information and the oscillation amplitude map during the belt slip control.

7. The control device for a belt type continuously variable transmission according to claim 3, wherein
the oscillation amplitude setter is configured to set an oscillation amplitude map having a relationship in which the oscillation amplitude is small as the gear ratio is on the side of the high gear ratio, and sets the oscillation amplitude map to an upper limit oscillation amplitude value characteristic where an oscillation amplitude allowance margin is added to the lower limit oscillation amplitude value characteristic, and the belt slip controller is configured to set a set oscillation amplitude to a small value that is a lower limit oscillation amplitude value in a gear ratio at the time as a limit, by setting the oscillation amplitude by following a change of the gear ratio based on gear ratio information and the oscillation amplitude map and performing control to reduce the actual secondary hydraulic pressure during the belt slip control, when the actual secondary hydraulic pressure oscillated by the set oscillation amplitude falls below a lowest possible pressure in a hydraulic pressure control system.

8. A control method for a belt type continuously variable transmission by a belt slip control in which a belt slip state among a primary pulley, a secondary pulley, and a belt is controlled with a hydraulic pressure, the method comprising:
oscillating the hydraulic pressure to control the hydraulic pressure on the basis of a multiplication value of an oscillation component included in an actual hydraulic pressure and an oscillation component of an actual gear ratio; and
setting an oscillation amplitude of the hydraulic pressure small when the gear ratio is a high gear ratio compared with when the gear ratio is a low gear ratio, in a case of oscillating the hydraulic pressure.

9. The control method for a belt type continuously variable transmission by a belt slip control according to claim 8, the method comprising:
estimating the belt slip state by monitoring a phase difference calculated based on the multiplication value, and controlling the hydraulic pressure to maintain a predetermined belt slip state based on the estimation.

10. A control method for a belt type continuously variable transmission by a belt slip control in which a belt slip state among a primary pulley, a secondary pulley, and a belt is controlled with a hydraulic pressure, the method comprising:
oscillating the hydraulic pressure to control the hydraulic pressure on the basis of a phase difference of an oscillation component included in an actual hydraulic pressure and an oscillation component of an actual gear ratio; and
setting an oscillation amplitude of the hydraulic pressure small when the gear ratio is a high gear ratio compared with when the gear ratio is a low gear ratio, in a case of oscillating the hydraulic pressure.

11. The control device for a belt type continuously variable transmission according to claim 2, wherein
the oscillation amplitude setter is configured to set the oscillation amplitude of the secondary hydraulic pressure to a value equal to or more than a lower limit oscillation amplitude value characteristic, when an oscillation component based on an oscillation of the secondary hydraulic pressure is a limit value of an oscillation amplitude included in the actual gear ratio, and a set of limit values of the oscillation amplitude that become small as the gear ratio is on a side of the high gear ratio is taken as the lower limit oscillation amplitude value characteristic.

12. The control device for a belt type continuously variable transmission according to claim 2, wherein
the oscillation amplitude setter is configured to set the oscillation amplitude of the secondary hydraulic pressure to a value less than or equal to an upper limit oscillation amplitude value, when a limit value of an oscillation amplitude that does not have an influence of a vehicle vibration occurring by an oscillation of the gear ratio based on the oscillation of the secondary hydraulic pressure on a passenger is taken as the upper limit oscillation amplitude value.

13. The control device for a belt type continuously variable transmission according to claim 2, wherein
when an oscillation component based on an oscillation of the secondary hydraulic pressure is a limit value of the oscillation amplitude included in the actual gear ratio, and a set of limit values of the oscillation amplitude that become small as the gear ratio is on a side of the high gear ratio is taken as a lower limit oscillation amplitude value characteristic, and a characteristic where an oscillation amplitude allowance margin is added to the lower limit oscillation amplitude value characteristic is taken as an upper limit oscillation amplitude value characteristic, and a limit value of an oscillation amplitude that does not have an influence of a vehicle vibration occurring by an oscillation of the gear ratio based on the oscillation of the secondary hydraulic pressure on a passenger is taken as an upper limit oscillation amplitude value, the oscillation amplitude setter is configured to set the oscillation amplitude of the secondary hydraulic pressure to a value corresponding to the gear ratio of a value within a range of a range surrounded by the lower limit oscillation amplitude value characteristic, the upper limit oscillation amplitude value characteristic, a line by a highest gear ratio, and a line by the upper limit oscillation amplitude.

14. The control device for a belt type continuously variable transmission according to claim 2, wherein
the oscillation amplitude setter is configured to set an oscillation amplitude map having a relationship in which the oscillation amplitude is small as the gear ratio is on the side of the high gear ratio, and the belt slip controller is configured to set the oscillation amplitude by following a change of the gear ratio based on gear ratio information and the oscillation amplitude map during the belt slip control.

* * * * *